(12) United States Patent
Nakamura et al.

(10) Patent No.: US 8,401,308 B2
(45) Date of Patent: Mar. 19, 2013

(54) INFORMATION PROCESSING DEVICE, INFORMATION PROCESSING METHOD, AND PROGRAM

(75) Inventors: Akira Nakamura, Kanagawa (JP); Takayuki Yoshigahara, Tokyo (JP); Yoshiaki Iwai, Tokyo (JP)

(73) Assignee: Sony Corporation, Tokyo (JP)

( * ) Notice: Subject to any disclaimer, the term of this patent is extended or adjusted under 35 U.S.C. 154(b) by 1064 days.

(21) Appl. No.: 11/764,449

(22) Filed: Jun. 18, 2007

(65) Prior Publication Data

US 2008/0013836 A1    Jan. 17, 2008

(30) Foreign Application Priority Data

Jun. 19, 2006    (JP) .................. 2006-168636

(51) Int. Cl.
*G06K 9/62* (2006.01)
*G06K 9/46* (2006.01)
*G06K 9/64* (2006.01)
(52) U.S. Cl. .......... 382/209; 382/203; 382/278
(58) Field of Classification Search ............ 382/209, 382/203, 278
See application file for complete search history.

(56) References Cited

U.S. PATENT DOCUMENTS

| 6,272,245 B1 * | 8/2001 | Lin | 382/195 |
| 2005/0213818 A1 * | 9/2005 | Suzuki et al. | 382/190 |

FOREIGN PATENT DOCUMENTS

| JP | 11-085988 | 3/1999 |
| JP | 2003-323622 | 11/2003 |
| JP | 2004-326603 | 11/2004 |
| JP | 2004-326693 | 11/2004 |

OTHER PUBLICATIONS

Hartley R. et al., *Multiple View Geometry in Computer Vision*, Chapter 3, "Estimation—2D Projective Transformations", pp. 69-116, Cambridge University Press, 2000.
Harris C. et al., "A Combined Corner and Edge Detector", in Proc. Alvey Vision Conf., pp. 147-151, 1988.
D. G. Lowe, "Object Recognition from Local Scale-Invariant Feature", IEEE international Conference on Computer Vision, vol. 2, pp. 1150-1157, 1999.
C. Schmid et al., "Local Grayvalue Invariants for Image Retrieval", IEEE Transactions on Patter Analysis and Machine Intelligence, vol. 19, No. 5, pp. 530-535, 1997.
T. Undeberg, "Scale-space: A Framework for Handling image Structures at Multiple Scales", Journal of Applied Statistics, vol. 21, No. 2, pp. 224-270, 1994.

* cited by examiner

*Primary Examiner* — Kathleen Y Dulaney
(74) *Attorney, Agent, or Firm* — Finnegan, Henderson, Farabow, Garrett & Dunner, L.L.P.

(57) ABSTRACT

Disclosed herein an information processing device that compares an input image with a model image, the device including: a storage; an object feature point extractor; and a feature comparator.

13 Claims, 24 Drawing Sheets

FIG.19

| | |
|---|---|
| P$_1$ (INLIER) | 40deg. |
| P$_2$ (INLIER) | 40deg. |
| P$_3$ (OUTLIER) | 110deg. |
| P$_4$ (OUTLIER) | 260deg. |
| P$_5$ (INLIER) | 40deg. |
| P$_6$ (INLIER) | 40deg. |

INFORMATION PROCESSING DEVICE, INFORMATION PROCESSING METHOD, AND PROGRAM

CROSS REFERENCES TO RELATED APPLICATIONS

The present invention contains subject matter related to Japanese Patent Application JP 2006-168636 filed with the Japan Patent Office on Jun. 19, 2006, the entire contents of which being incorporated herein by reference.

BACKGROUND OF THE INVENTION

1. Field of the Invention

The present invention relates to an information processing device, information processing method, and program, and particularly to an information processing device, information processing method, and program that can further enhance the accuracy of matching between an input image and a model image.

2. Description of the Related Art

As existing image recognition schemes, there are matching schemes in which features points are extracted from an image and features acquired from the image information of the feature points and local neighborhoods thereof are used.

For example, C. Schmid and R. Mohr propose a matching scheme in which corners detected by using the Harris corner detector are employed as feature points and rotation-invariant features of neighborhoods of the feature points are used (refer to C. Schmid and R. Mohr, "Local grayvalue invariants for image retrieval", (USA), IEEE PAMI, 1997, vol. 19, no. 5, p. 530-534, hereinafter Non-Patent Document 1). In this matching scheme, in which local features of feature points invariant to partial image deformation are used, stable detection is possible even when an image involves deformation and even when a detection target is partially hidden. However, the features employed in this scheme of Non-Patent Document 1 do not have invariance to scaling of an image, and therefore recognition is difficult when an image involves scaling.

In contrast, D. Lowe proposes a matching scheme that employs feature points and features invariant also to image scaling (refer (refer to D. Lowe, "Object recognition from local scale-invariant features", (Greece), Proc. of the International Conference on Computer Vision, 1999 Sep., vol. 2, p. 1150-1157, hereinafter Non-Patent Document 2). An image recognition device proposed by D. Lowe will be described below with reference to FIG. 1.

In the image recognition device shown in FIG. 1, feature point extractors 1a and 1b apply a Difference-of-Gaussian (DoG) filter to each of images of different resolutions obtained from an image as the target of feature point extraction (model image or input image) based on multi-resolution image representation (scale-space representation, refer to Lindeberg T., "Scale-space: A framework for handling image structures at multiple scales", Journal of Applied Statistics, vol. 21, no. 2, pp. 224-270, 1994). Of local points (local maxima and local minima) on the images output through the DoG filter, points of which position does not change in resolution changes within a predetermined range are detected as feature points by the feature point extractors 1a and 1b. The number of levels of the resolutions is set in advance.

Features storages 2a and 2b extract and hold the features of the respective features points extracted by the feature point extractors 1a and 1b. The feature point extractors 1a and 1b use the canonical orientation (dominant orientation) and the orientation planes of the neighboring area of the feature point. The canonical orientation refers to the orientation that offers the peak of an orientation histogram in which Gaussian-weighted gradient magnitudes are accumulated. The feature storages 2a and 2b hold the canonical orientations as the features. Furthermore, the features storages 2a and 2b normalize the gradient magnitude information of the neighboring area of a feature point by the canonical orientation, i.e., the feature storages 2a and 2b carry out orientation correction with the canonical orientation defined as 0 deg, and classify by the gradient orientation the gradient magnitude information of the respective points in the neighboring area together with the position information. For example, when the gradient magnitude information of the respective points in a neighboring area is classified in total eight orientation planes at angle increments of 45 deg, the gradient information of an orientation of 93 deg and a magnitude m of a point (x, y) on the local coordinate system of the neighboring area is mapped as information of the magnitude m at the position (x, y) on the orientation plane having a 90-deg label and the same local coordinate system as that of the neighboring area. After the classification, each orientation plane is subjected to blurring and resampling dependent upon the scale of the resolution. The features storages 2a and 2b hold the thus obtained feature vectors of dimensions of (the number of resolutions)×(the number of orientation planes)×(the size of each orientation plane).

Subsequently, a features matching unit 3 retrieves model feature points having features that are the most similar to those of the respective object features points by using the k-d tree method (Nearest Neighbor search method on a features space offering good retrieval efficiency), and holds obtained match pairs as a match pair group.

A model pose coarse-estimation unit 11 in a recognition determination unit 4 estimates, by the generalized Hough transform, the pose (image transformation parameters such as a rotation angle, scaling ratio, and translation amount) of a model on the input image from the spatial positional relationship between the model features points and the object feature points. At this time, the above-described canonical orientations of the respective features points will be used as indexes in a parameter reference table (R table) of the generalized Hough transform. The output of the model pose coarse-estimation unit 11 is equivalent to the result of voting on the image transformation parameter space. The parameter that has acquired the largest vote counts offers coarse estimation of the model pose.

A candidate corresponding feature point pair selector 12 in the recognition determination unit 4 selects only the match pairs each having as its member the object feature point that has voted to this parameter, to thereby refine the match pair group.

Finally, a model pose estimator 13 in the recognition determination unit 4 estimates affine transformation parameters from the spatial arrangement of the corresponding feature point pair group by least-squares estimation, under constraint that "the detected model involves image deformation due to affine transformation on the input image". Furthermore, the model pose estimator 13 transfers the respective model features points of the match pair group on the input image based on the affine transformation parameters, and obtains the position shift (spatial distance) of the transferred feature points from the corresponding object feature point. In addition, the model pose estimator 13 eliminates match pairs involving a greatly large position shift to thereby update the match pair group. At this time, if the number of match pairs included in the match pair group is two or less, the model pose estimator 13 outputs an indication that "model detection is impossible"

and ends its operation. If not so, the model post estimator 13 repeats this operation until a predetermined end condition is satisfied, and finally outputs, as a model recognition result, the model pose determined by the affine transformation parameters obtained when the end condition is satisfied.

However, this scheme by D. Lowe described in Non-Patent Document 2 involves several problems.

First, a problem exists in the extraction of the canonical orientation of a feature point. As described above, the canonical orientation is obtained as the orientation that offers the peak of an orientation histogram arising from accumulation of Gaussian-weighted gradient magnitudes, obtained from local gradient information of the neighboring area of a feature point. The scheme of Non-Patent Document 2 has a tendency that a point slightly inside a corner of an object is detected as a feature point. In the orientation histogram of the neighborhood of such a feature point, two peaks appear as the orientations perpendicular to the edge, and therefore plural conflicting canonical orientations will be possibly detected. However, the feature matching unit 3 and the model pose estimator 13 at the subsequent stages are not designed for such a situation and thus cannot address the situation. Furthermore, there is also another problem that the shape of an orientation histogram changes depending on the parameters of the Gaussian weighting function and hence stable extraction of the canonical orientations is impossible. In addition, because the canonical orientations are used in the features matching unit 3 and the model pose estimator 13 at the subsequent stages, the extraction of improper canonical orientations has significantly adverse effects on the result of the feature matching.

Second, in feature comparison based on the orientation planes, feature matching based on the density gradient magnitude information of the respective points in a local area is carried out. However, the gradient magnitude is not a feature invariant to luminosity changes in general. Therefore, when there is a luminosity difference between a model image and an input image, stable matching fails to be ensured problematically.

Third, the following situation would be possible: there are plural model feature points of which distance on a feature space with respect to the corresponding object feature point is not the smallest but sufficiently small, i.e., there are plural model feature points each having a sufficiently similar feature, and feature points of true feature points pairs (inliers) are included in these model feature points. However, in the feature matching unit 3, each object feature point is paired with only the model feature point having the smallest distance in the feature space, and therefore these inliers are not taken into consideration as candidate corresponding pairs problematically.

Fourth, a problem is possibly caused in the estimation of affine transformation parameters in the recognition determination unit 74. Specifically, false feature point pairs (outliers) will be included in the corresponding feature point pair group resulting from the refining by the candidate corresponding feature point pair selector 12. If a large number of outliers are included in the match pair group of there are outliers that extremely depart from true affine transformation parameters, the estimation of affine transformation parameters is affected by the outliers. Furthermore, depending on the case, inliers are gradually eliminated through repeated operation while the outliers are left, so that an erroneous model pose is output problematically.

SUMMARY OF THE INVENTION

There is a need for the present invention to enhance the accuracy of matching between an input image and a model image, with an aim at addressing the need to allow detection of an object even from an input image that includes plural objects partially overlapping with each other, and allow stable detection of an object even against a viewpoint change (image transformation including translation, scaling, rotation, and stretch), luminosity change, and deformation of image information due to noise.

An invention similarly having this aim of the present invention has been applied by the present assignee and disclosed in Japanese Patent Laid-open No. 2004-326693. The present invention is to add an advantage that matching accuracy can be further enhanced to advantages by the invention disclosed in Japanese Patent Laid-open No. 2004-326693. Advantageous effects by the present invention become more obvious when the difference in the image angle is large between a model image and an input image in particular.

According to one embodiment of the present invention, there is provided an information processing device that compares an input image with a model image. The device includes a storage configured to hold a feature of each of at least one model feature point on the model image and hold a feature of each of at least one model feature point one each of N (N is an integer value equal to or larger than one) transformed images that are each obtainable through transformation of the model image based on a respective one of N transformation coefficients, an object feature point extractor configured to extract at least one feature point on the input image as an object feature point, an object feature extractor configured to extract a feature of each of the at least one object feature point extracted by the feature point extractor, and a feature comparator configured to compare each of the at least one object feature point of which feature has been extracted by the object feature extractor with each of the at least one model feature point held by the storage about each of the model image and the N transformed images, and creates at least one match pair between an object feature point and a model feature point having the features that have been determined to be similar to each other through the comparison.

According to one embodiment of the present invention, there is provided an information processing method of an information processing device that compares an input image with a model image. The method includes the steps of holding a feature of each of at least one model feature point on the model image and holding a feature of each of at least one model feature point on each of N (N is an integer value equal to or larger than one) transformed images that are each obtainable through transformation of the model image based on a respective one of N transformation coefficients, extracting at least one feature point on the input image as an object feature point, extracting a feature of each of the extracted at least one object feature point, and comparing each of the at least one object feature point of which feature has been extracted with each of the held at least one model feature point of each of the model image and the N transformed images, and creating at least one match pair between an object feature point and a model feature point having the features that have been determined to be similar to each other through the comparison.

According to one embodiment of the present invention, there is provided a program corresponding to the above-described information processing method according to one embodiment of the present invention.

In the information processing device, information processing method, and program according to one embodiment of the present invention, comparison between an input image and a model image is carried out in the following manner. Specifically, a feature of each of at least one model feature point on the model image is held, and a feature of each of at least one model feature point on each of N (N is an integer value equal to or larger than one) transformed images that are each obtainable through transformation of the model image based on a respective one of N transformation coefficients is held. Furthermore, at least one feature point on the input image is extracted as an object feature point, and a feature of each of the extracted at least one object feature point is extracted. Moreover, each of the at least one object feature point of which feature has been extracted is compared with each of the held at least one model feature point of each of the model image and the N transformed images, and at least one match pair is created between an object feature point and a model feature point having the features that have been determined to be similar to each other through the comparison.

The embodiments of the present invention can address the need to allow detection of an object even from an input image that includes plural objects partially overlapping with each other, and allow stable detection of an object even against a viewpoint change (image transformation including translation, scaling, rotation, and stretch), luminosity change, and deformation of image information due to noise. In particular, the embodiments of the present invention can enhance the accuracy of matching between an input image and a model image even when the difference in the imaging angle is large between the model image and the input image.

BRIEF DESCRIPTION OF THE DRAWINGS

FIG. 19 is a diagram for explaining one method for the mismatch pair removal processing in the recognition processing of FIG. 13;

DETAILED DESCRIPTION OF THE PREFERRED EMBODIMENTS

An embodiment of the present invention will be described below. Prior to the description of the embodiment, the correspondence relationships between the configuration elements set forth in the claims and specific examples in the specification or a drawing will be exemplified. This exemplification is to confirm that specific examples for supporting the invention set forth in the claims are described in the specification or a drawing. Therefore, even when there is a specific example that is not shown in the exemplification as an entity corresponding to a configuration element although it is described in the specification or a drawing, this does not mean that this specific example does not correspond to the configuration element. On the other hand, although specific examples are shown in the exemplification as an entity corresponding to a configuration element, this does not mean that these specific examples do not correspond to a configuration element other than the configuration element.

Moreover, the exemplification does not mean that all of the invention corresponding to specific examples described in the specification or a drawing is set forth in the claims. In other words, the exemplification does not deny the existence of an invention that corresponds to a specific example described in the specification or a drawing but is not set forth in the claims of this application, i.e., the existence of an invention that will be subjected to divisional application in the future and an invention that will be added based on amendment in the future.

Figure 6:
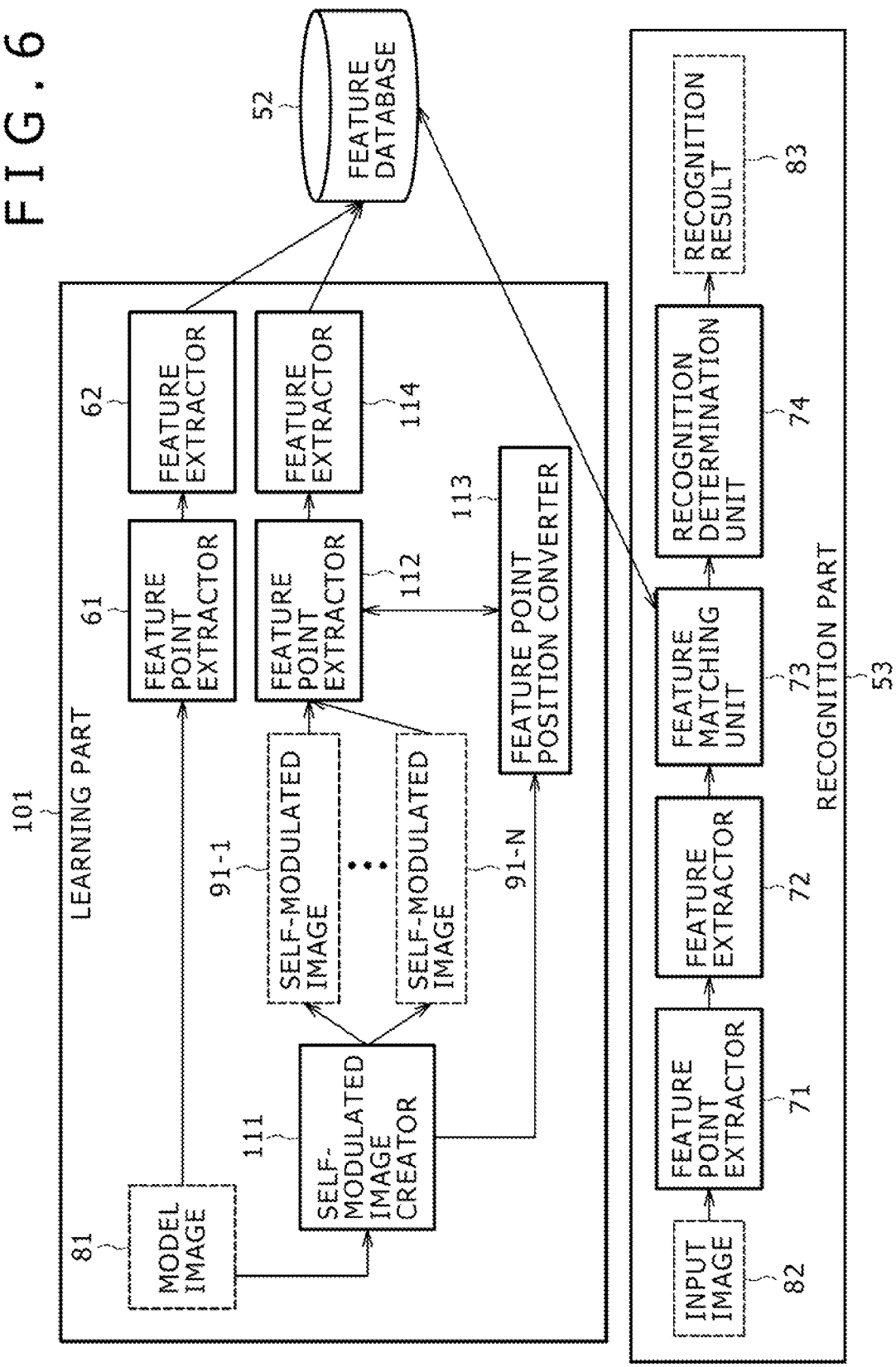
FIG. 6 is a block diagram showing a configuration example of an image recognition device to which the self-modulated image matching scheme is applied, as an image recognition device to which an embodiment of the invention is applied.
Figure 23:
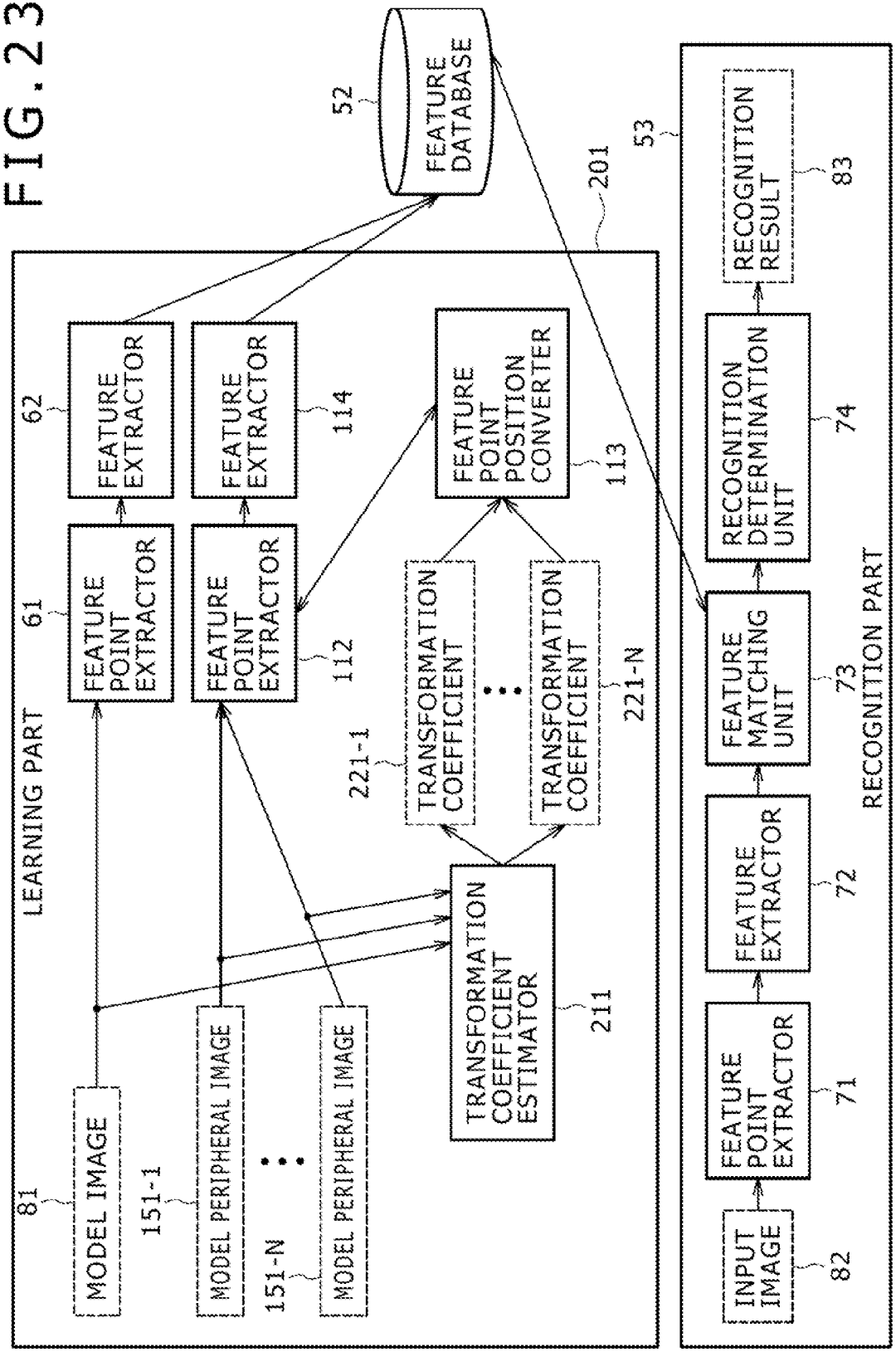
FIG. 23 is a block diagram showing a configuration example of an image recognition device to which the model peripheral image matching scheme is applied, as an image recognition device to which an embodiment of the invention is applied.

An information processing device (e.g. an image recognition device of FIG. 6 or 23) according to one embodiment of the present invention compares an input image (e.g. an input image 82 of FIG. 6 or 23) with a model image (e.g. a model image 81 of FIG. 6 or 23). The device includes: a storage (e.g. a feature database 52 of FIG. 6) configured to hold a feature of each of at least one model feature point on the model image and hold a feature of each of at least one model feature point on each of N (N is an integer value equal to or larger than one) transformed images (e.g. self-modulated images 91-1 to 91-N in the example of FIG. 6 or model peripheral images 151-1 to 151-N in the example of FIG. 23) that are each obtainable through transformation of the model image based on a respective each of N transformation coefficients; an object feature point extractor (e.g. a feature point extractor 71 of FIG. 6 or 23) configured to extract at least one feature point on the input image as an object feature point; an object feature extractor (e.g. a feature extractor 72 of FIG. 6 or 23) configured to extract a feature of each of the at least one object feature point extracted by the feature point extractor; and a feature comparator (e.g. a feature matching unit 73 of FIG. 23) configured to compare each of the at least one object feature point of which feature has been extracted by the object feature extractor with each of the at least one model feature point held by the storage about each of the model image and the N transformed images, and creates at least one match pair between an object feature point and a model feature point having the features that have been determined to be similar to each other through the comparison.

The storage holds a position of each of the at least one model feature point of each of the model image and the N transformed images in such a manner as to associate the position with the feature, the at least one match pair created by the feature comparator includes a position of the object feature point and the position of the model feature point held by the storage, and the position of the model feature point of the transformed image is a second position on the model image corresponding to a first position of the model feature point on the transformed image.

When the information processing device is e.g. the image recognition device of FIG. 6, the device further includes: a transformed-image creator (e.g. a self-modulated image creator 111 of FIG. 6) configured to create each of the N transformed images (e.g. self-modulated images 91-1 to 91-N of FIG. 6) from the model image by using a respective one of the N transformation coefficients as known transformation coefficients; a model feature point extractor (e.g. feature point extractors 61 and 112 of FIG. 6) configured to extract at least one feature point on the model image and the N transformed images created by the transformed-image creator as the model feature point; a model feature extractor (e.g. feature extractors 62 and 114 of FIG. 6) configured to extract the feature of each of the at least one model feature point extracted by the model feature point extractor; and a position converter (e.g. a feature point position converter 113 of FIG. 6) configured to convert a position of each of the at least one model feature point on the N transformed images, of the at least one model feature point extracted by the model feature point extractor, from the first position into the second position by using a corresponding one of the N transformation coefficients.

When the information processing device is e.g. the image recognition device of FIG. 23, N images each arising from imaging from a respective one of N viewpoints that are different from a viewpoint of the model image and in a periphery of the viewpoint of the model image are input to the information processing device as the N transformed images (e.g. model peripheral images 151-1 to 151-N of FIG. 23). Furthermore, the device further includes: a model feature point extractor (e.g. feature point extractors 61 and 112 of FIG. 23) configured to extract at least one feature point on the model image and the input N transformed images as the model feature point; a model feature extractor (e.g. feature extractors 62 and 114 of FIG. 23) configured to extract the feature of each of the at least one model feature point extracted by the model feature point extractor; an estimator (e.g. a transformation coefficient estimator 211 of FIG. 23) configured to estimate each of the N transformation coefficients based on the model image and the input N transformed images; and a position converter (e.g. a feature point position converter 113 of FIG. 23) configured to convert a position of each of the at least one model feature point on the input N transformed images, of the at least one model feature point extracted by the model feature point extractor, from the first position into the second position by using a corresponding one of the N transformation coefficients estimated by the estimator.

The device further includes a recognizer (e.g. a recognition determination unit 74 of FIG. 6 or 23) configured to remove a mismatch pair from the at least one match pair created by the feature comparator by using at least one predetermined method, and recognize whether or not an object that is the same as an object included in the model image exists in the input image.

Figure 13:
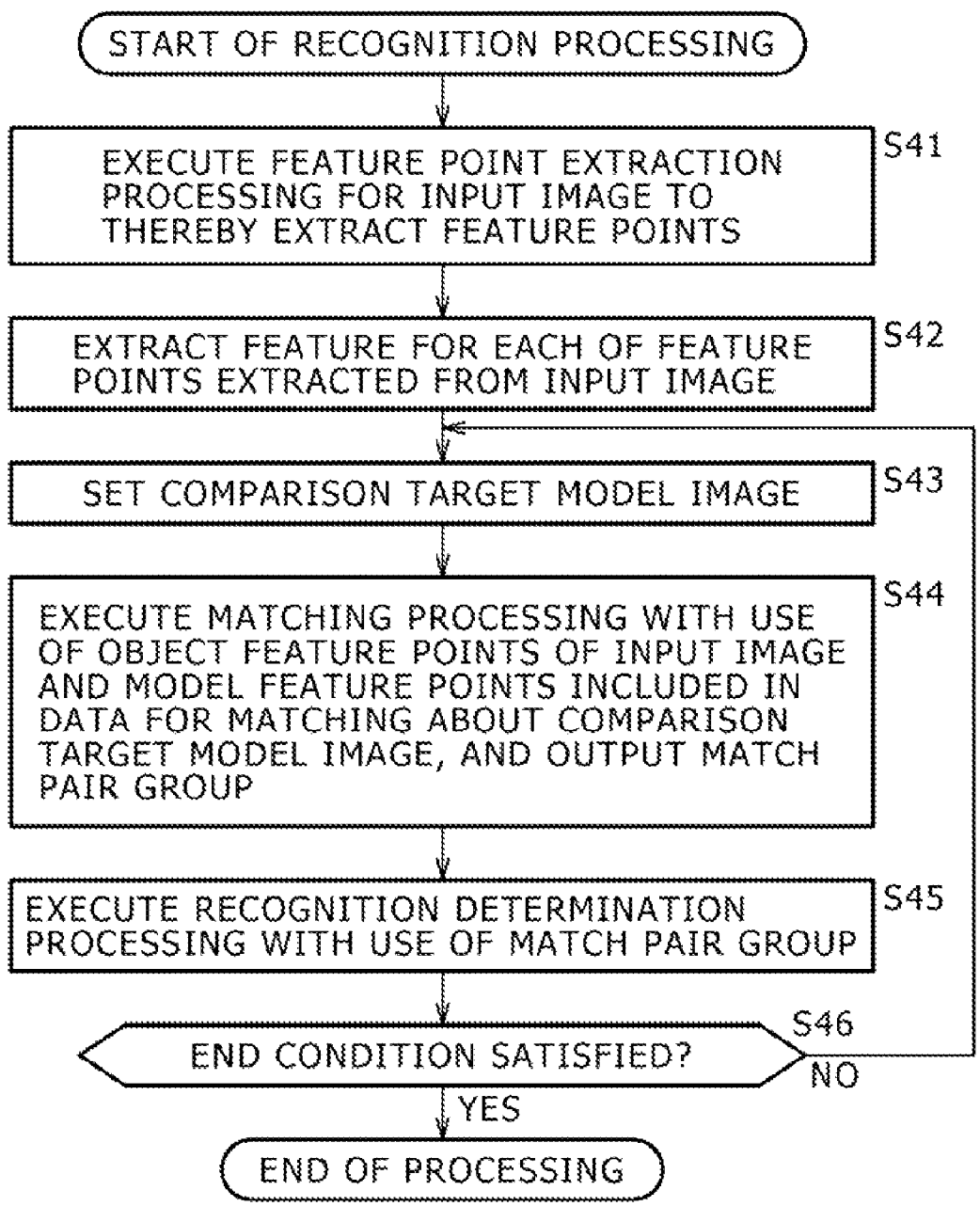
FIG. 13 is a flowchart for explaining an example of recognition processing executed by the image recognition device of FIG. 6.

An information processing method of an information processing device (e.g. an image recognition device of FIG. 6 or 23) that compares an input image with a model image includes the steps of: holding a feature of each of at least one model feature point on the model image and holding a feature of each of at least one model feature point on each of N (N is an integer value equal to or larger than one) transformed images that are each obtainable through transformation of the model image based on a respective one of N transformation coefficients (e.g. learning processing of FIG. 7 and a step S8 thereof in particular); extracting at least one feature point on the input image as an object feature point (e.g. a step S41 of FIG. 13); extracting a feature of each of the extracted at least one object feature point (e.g. a step S42 of FIG. 13); and comparing each of the at least one object feature point of which feature has been extracted with each of the held at least one model feature point of each of the model image and the N transformed images, and crating at least one match pair between an object feature point and a model feature point having the features that have been determined to be similar to each other through the comparison (e.g. a step S44 of FIG. 13).

Furthermore, according to another embodiment of the present invention, there are also provided a program corresponding to the above-described information processing method according to one embodiment of the present invention and a recording medium in which the program is recorded. This program is executed by e.g. a computer of FIG. 25 as described later.

Prior to the description of an embodiment of the present invention, the principle of the present invention will be described below.

Initially, for easy understanding of the principle of the present invention, the outline of an image recognition device disclosed in the above-mentioned Japanese Patent Laid-open No. 2004-326693 (hereinafter, referred to simply as an existing image recognition device) will be described below.

Figure 1:
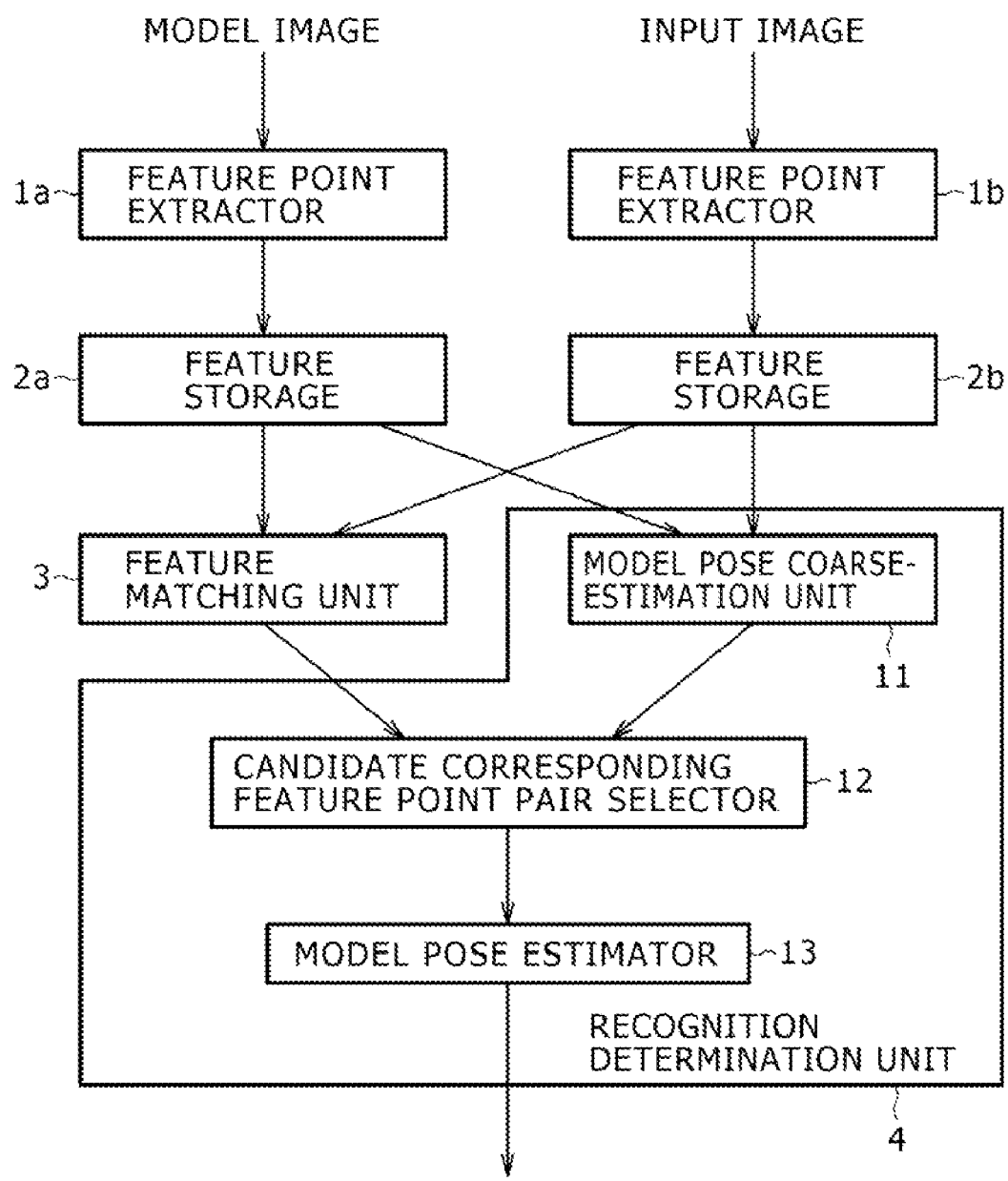
FIG. 1 is a block diagram showing a configuration example of an existing image processing device.
Figure 2:
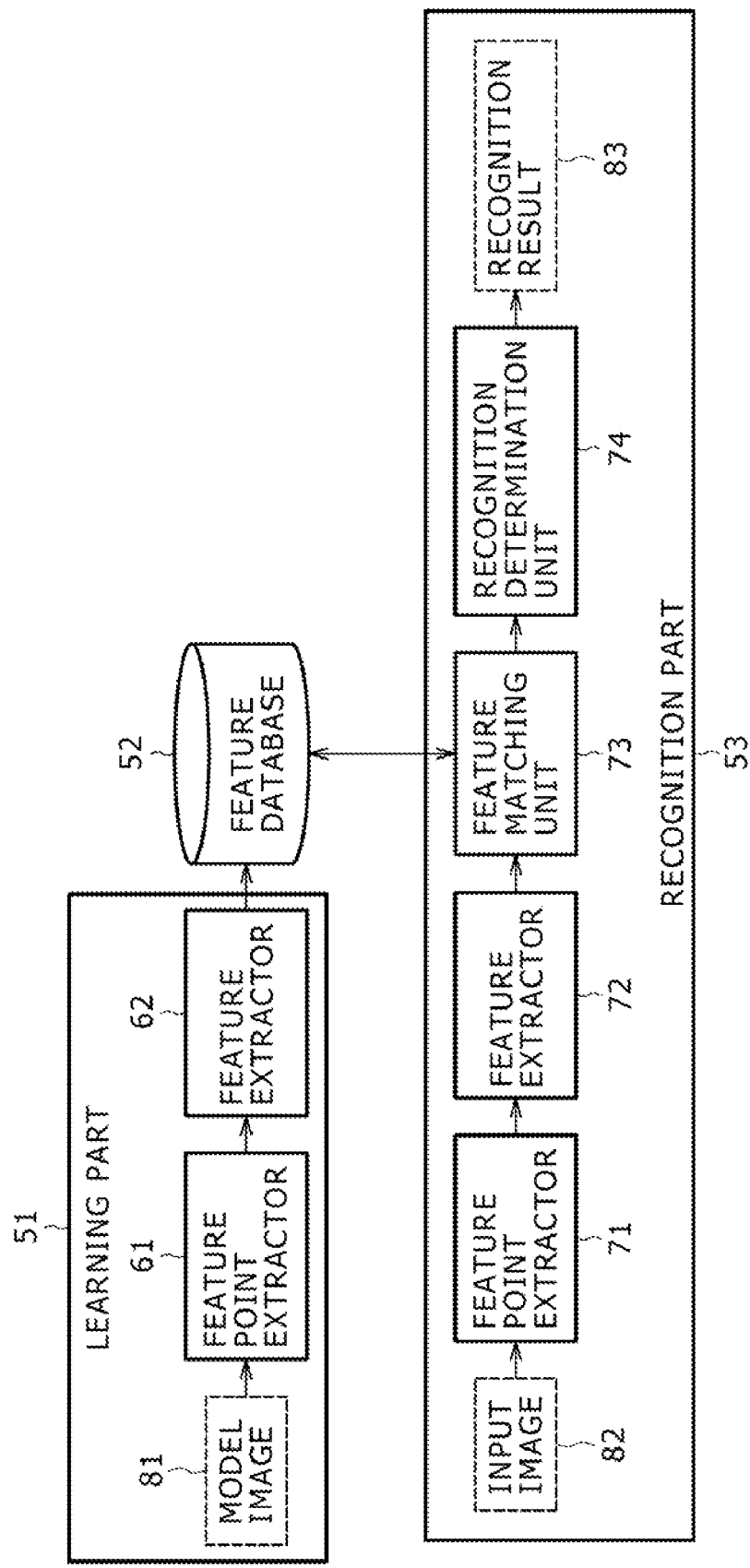
FIG. 2 is a block diagram showing a configuration example of another existing image processing device.

FIG. 2 shows a configuration example of the existing image recognition device.

In FIG. 2, the squares made by full lines indicate a block as the device or components thereof, while the squares made by dashed lines indicate certain information such as image information. The meanings of the full-line square and dashed-line square are the same also in other drawings to be described later.

The existing image recognition device includes a learning part 51, a feature database 52, and a recognition part 53.

The learning part 51 includes a feature point extractor 61 and a feature extractor 62.

The feature point extractor 61 extracts feature points from a model image 81 and provides the feature points to the feature extractor 62.

Hereinafter, when there is a need to differentiate a feature point extracted from a model image such as the model image 81 from a feature point extracted from an input image 82 to be described later, the former one will be referred to as a model feature point while the latter one will be referred to as an object feature point.

The feature extractor 62 extracts a feature to be described later for each of the model feature points extracted by the feature point extractor 61, and stores the extracted features together with the position information of the model feature points in the feature database 52.

Although only one model image 81 is shown in the example of FIG. 2, plural model images are given to the learning part 51 in practice. That is, in a practical feature database 52, features of each of the plural model images are stored together with the position information of the corresponding model feature points.

The recognition part 53 includes units from a feature point extractor 71 to a recognition determination unit 74.

The feature point extractor 71 extracts object feature points from the input image 82 and provides the object feature points to a feature extractor 72. The feature extractor 72 extracts a feature to be described later for each of the object feature points extracted by the feature point extractor 71, and provides a feature matching unit 73 with the extracted features together with the position information of the object feature points.

The feature matching unit 73 compares the features of the respective model feature points of the model image 81 stored in the feature database 52 with the features of the respective object feature points extracted by the feature extractor 72, to thereby calculate the similarities and dissimilarities between the features. Furthermore, by using the similarity scale as the calculation result, the feature matching unit 73 creates at least one pair of feature points of which features are similar to each other, i.e., at least one pair of a model feature point and an object feature point that will correspond to each other highly probably. Hereinafter, such a pair will be referred to as a match pair, and a collection of at least one match pair will be referred to as a match pair group.

The match pair group created by the feature matching unit 73 is provided to the recognition determination unit 74. The recognition determination unit 74 detects the presence or absence of a model on the input image 82 by using this match pair group. When the determination result is that "a model is present", under constraint that "the detected model involves image deformation due to affine transformation on the input image", the recognition determination unit 74 repeats operation of projecting, on a parameter space, affine transformation parameters determined by three pairs randomly selected from the match pair group. Furthermore, the recognition determination unit 74 defines the respective members in the cluster having the largest number of members among clusters formed on the parameter space as true match pairs (inliers), and obtains affine transformation parameters through least-squares estimation with use of the inliers. The recognition determination unit 74 can output the model pose determined by the affine transformation parameters as a recognition result 83 for example.

Figure 3:
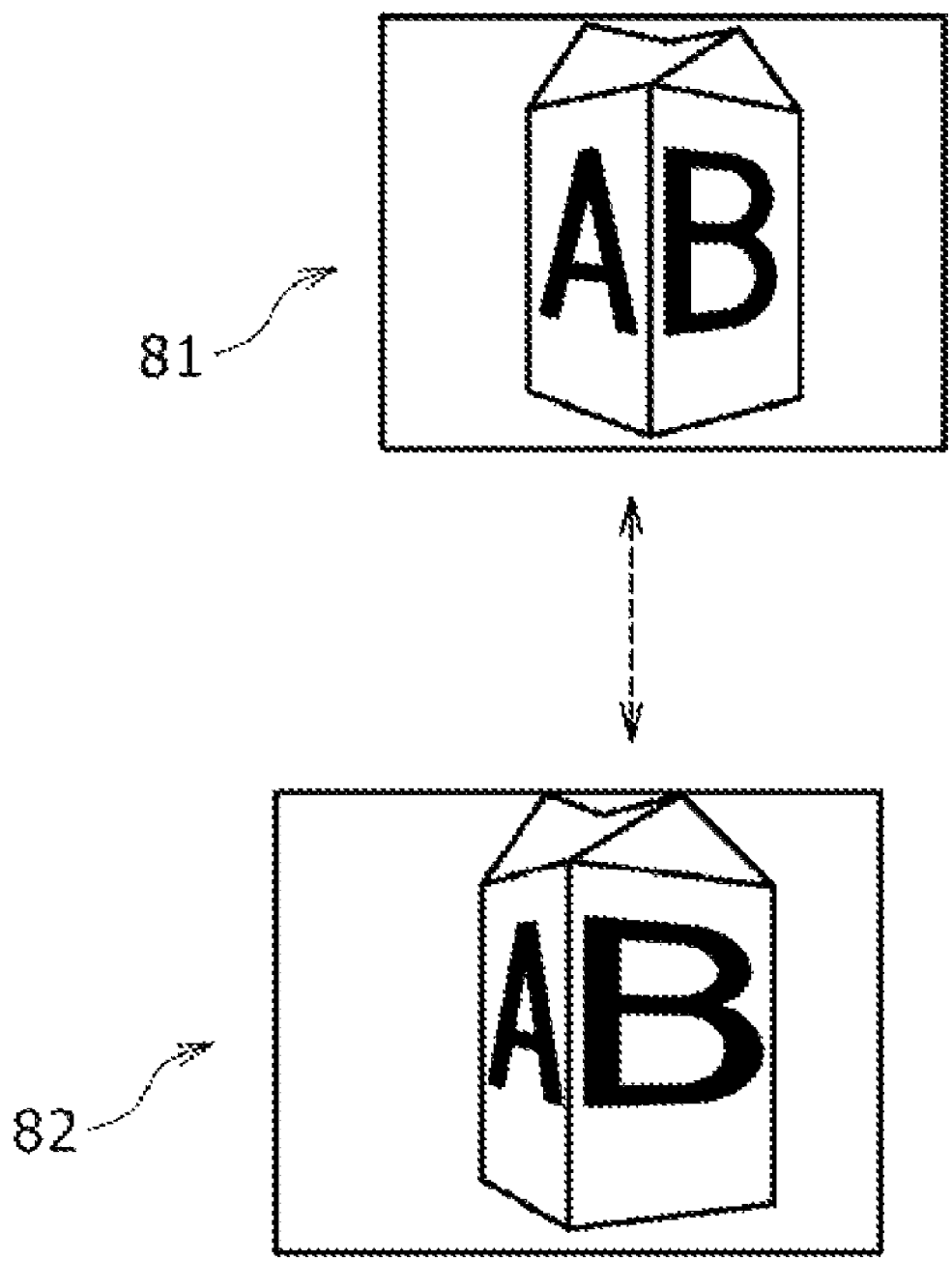
FIG. 3 is a diagram for explaining the outline of feature matching in the existing image processing device of FIG. 2.

As described above, the existing feature matching unit 73 carries out matching between the local features of the model image 81 and the input image 82 like those shown in FIG. 3 for example.

In this case, when the imaging angle is different between the model image 81 and the input image 82, i.e., when the input image 82 of which viewpoint is greatly different from that of the model image 81 is input, the accuracy of matching between local features is low in general. Furthermore, also when an image that arises from imaging of a 3D-object and in which a certain plane of the 3D-object is enlarged and another plane thereof is reduced is input as the input image 82, the accuracy of matching between local features is low similarly.

Figure 4:
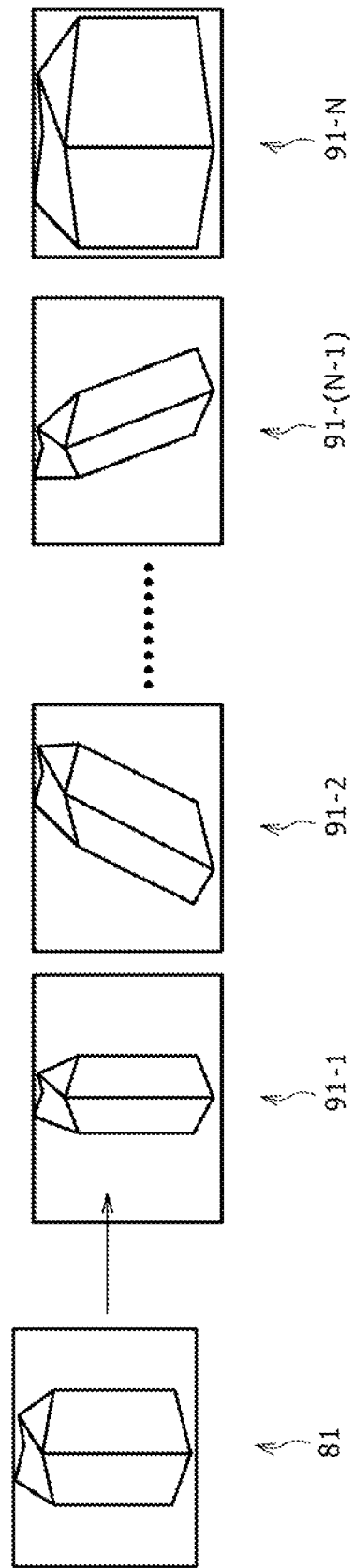
FIG. 4 is a diagram for explaining a self-modulated image matching scheme as one mode of a scheme according to an embodiment of the present invention.
Figure 5:
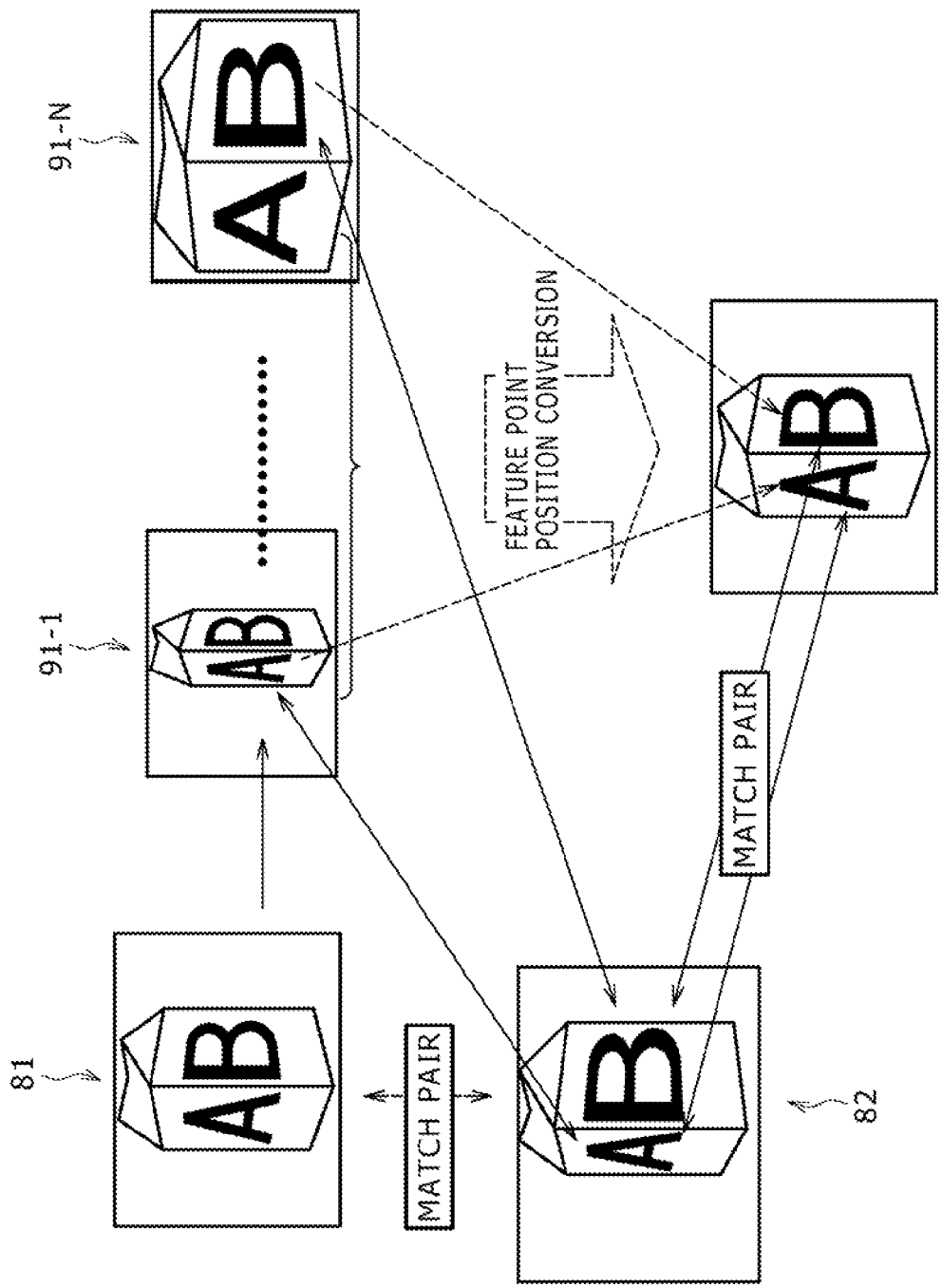
FIG. 5 is a diagram for explaining the self-modulated image matching scheme as one mode of the scheme according to an embodiment of the invention.

Therefore, in order to achieve high matching accuracy even in these cases, the present inventors have made a scheme shown in FIGS. 4 and 5.

The scheme made by the present inventors includes steps from a first step to a sixth step to be described below.

Specifically, the first step is to, as shown in FIG. 4, create each of N (N is an integer number equal to or larger than one) self-modulated images 91-1 to 91-N from the model image 81 by using a respective one of N transformation coefficients.

The second step is to extract model feature points from each of the model image 81 and the self-modulated images 91-1 to 91-N and extract local features from the peripheries of the model feature points.

The third step is to hold the features and the position information of the corresponding model feature points. A noteworthy point of the third step is that, for each of the self-modulated images 91-1 to 91-N, the positions of the points on the original model image 81 corresponding to the feature points extracted from the self-modulated image are obtained by using the transformation coefficient used in the creation of the self-modulated image in the first step, and the obtained positions of the corresponding points are stored as the position information to the model feature points.

The steps from the first step to the third step serve as a learning step. The existing learning step is equivalent to the processing step in the learning part 51 in FIG. 2. In this existing learning step, merely features are extracted and stored only for the model image 81. In contrast, in the steps from the first step to the third step included in the scheme made by the present inventors, features are extracted and stored not only for the model image 81 but only for each of the N self-modulated images 91-1 to 91-N.

In addition to the learning step, the scheme includes a processing step for matching with local features of the input image 82, carried out at the time of recognition. The steps from the fourth step to the sixth step to be described below are equivalent to this matching processing step.

The fourth step is to carry out matching between local features of the input image 82 and the respect local features stored in the third step. A noteworthy point of the fourth step is that the respective local features stored in the third step encompass not only local features of the model image 81 but also local features of each of the N self-modulated images 91-1 to 91-N. That is, the fourth step is to, as shown in FIG. 5, carry out matching of local features with the input image 82 not only for the model image 81 but also for each of the self-modulated images 91-1 to 91-N.

The fifth step is to obtain a match pair group based on the result of the fourth step. In this fifth step, for the match pairs including the model feature points of the self-modulated images 91-1 to 91-N of all the match pairs included in the match pair group, as the position information of these model feature points, not the positions of the model feature points on the self-modulated images 91-1 to 91-N but the positions stored in the above-described third step, i.e., the position of the corresponding points on the original model image 81, are coupled to the positions of matching object feature points of the input image 82. Specifically, as shown in FIG. 5, match pairs are created not between object feature points of the input image 82 and feature points existing on the self-modulated images 91-1 to 91-N, but between object feature points of the input image 82 and the points on the original model image 81 corresponding to the respective feature points on the self-modulated images 91-1 to 91-N.

In the sixth step, the match pair group obtained in the fifth step is sent as a collection of candidates for match pairs between the input image 82 and the model image 81 to the latter stage of the recognition step, i.e., to the recognition determination unit 74 in FIG. 6 to be described later.

Hereinafter, the scheme including the steps from the first step to the sixth step will be referred to as a self-modulated image matching scheme.

Even when the viewpoint is greatly different between the model image 81 and the input image 82, an image of which viewpoint is similar to that of the input image 82 will be included in the self-modulated images 91-1 to 91-N. Therefore, the matching accuracy can be enhanced compared with the existing scheme because the result of matching between local features of such an image and the input image 82 can also be utilized.

In other words, not only the model image 81 but also at least one image that is obtainable through transformation of the model image 81 based on a predetermined transformation coefficient is prepared as the targets of matching of local features with the input image 82. Due to this, even when the viewpoint is greatly different between the model image 81 and the input image 82, a transformed image of which degree of matching with the input image 82 is greatly higher than that of the model image 81 will be included in the prepared images, i.e., a transformed image of which viewpoint is similar to that of the input image 82 will be included. Thus, the matching accuracy is enhanced compared with the existing scheme.

The outline of the above description is as follows. In the scheme according to an embodiment of the present invention, the features of model feature points on the model image 81 are stored. Furthermore, also for each of N (N is an integer number equal to or larger than one) transformed images that are obtainable through transformation of the model image 81 based on a respective one of N transformation coefficients, the features of model feature points on the image are stored. Subsequently, each of object feature points on the input image 82 is compared with each of the model feature points of each of the model image 81 and the plural transformed images, so that at least one pair is created between an object feature point and a model feature point having features that have been determined to be similar to each other through the comparison.

Of the scheme according to an embodiment of the present invention, the scheme of employing the self-modulated images 91-1 to 91-N as the plural transformed images is equivalent to the above-described self-modulated image matching scheme. That is, the self-modulated image matching scheme is one mode of the scheme according to an embodiment of the present invention. In other words, the plural transformed images used in the scheme according to an embodiment of the present invention are not particularly limited to the self-modulated images 91-1 to 91-N, but may be any other images as long as the images can be created from the model image 81 by using predetermined transformation coefficients. Another specific example of the plural transformed images will be described later with reference to FIG. 22.

An embodiment of the present invention will be described below with reference to the accompanying drawings.

FIG. 6 shows a functional configuration example of an image recognition device to which the self-modulated image matching scheme of the above-described scheme according to an embodiment of the present invention is applied.

The same parts in FIG. 6 as those in FIG. 2 are given the same numerals, and the description thereof is accordingly omitted.

In the example of FIG. 6, the image recognition device includes a learning part 101, a feature database 52, and a recognition part 53.

Similarly to the existing image recognition device of FIG. 2, a feature point extractor 61 extracts feature points from a model image 81 and provides the feature points to a feature extractor 62. The feature extractor 62 extracts the feature of each of the model feature points extracted by the feature point extractor 61, and stores the extracted features together with the position information of the model feature points in the feature database 52.

A self-modulated image creator 111 creates each of N self-modulated images 91-1 to 91-N from the model image 81 by using a respective one of N transformation coefficients, and provides the created images to a feature point extractor 112. Furthermore, the self-modulated image creator 111 informs a feature point position converter 113 of each of the N transformation coefficients.

Hereinafter, when there is no need to differentiate the self-modulated images 91-1 to 91-N from each other, the self-modulated images 91-1 to 91-N will be referred to simply as self-modulated images 91.

The feature point extractor 112 extracts model feature points from the self-modulated images 91 and informs the feature point position converter 113 of the positions of the model feature points on the self-modulated images 91. The feature point position converter 113 converts the positions of the model feature points on the self-modulated images 91 into the corresponding positions on the model image 81 by using the transformation coefficients informed by the self-modulated image creator 111, and informs the feature point extractor 112 of the corresponding positions resulting from the conversion. In other words, the feature point position converter 113 executes reverse-conversion processing opposite to the conversion processing by the self-modulated image creator 111, to thereby convert the position information of the model feature points from the positions on the self-modulated images 91 into the corresponding positions on the model image 81. The feature point extractor 112 provides a feature extractor 114 with the model feature points associated with the corresponding positions thereof on the model image 81.

The feature extractor 114 extracts the feature of each of the model feature points extracted by the feature point extractor 112, and stores in the feature database 52 of the extracted features associated with the corresponding positions of the feature points of the features on the model image 81. That is, not the positions of the model feature points on the self-modulated images 91 but the positions of the corresponding points of the model feature points on the model image 81 are stored in the feature database 52 as the position information of the model feature points of the self-modulated images 91.

Although only one model image 81 is shown in the example of FIG. 6 similarly to the example of FIG. 2, plural model images are given to the learning part 101 in practice.

Specifically, in a practical feature database 52, for each of the plural model images, the respective features and the position information of the respective model feature points (corresponding positions on the model image 81 for the self-modulated images 91) of the original model image and the N self-modulated images 91-1 to 91-N are stored.

The recognition part 53 has the same configuration as that in the example of FIG. 2 basically, and hence the description of the configuration is omitted.

However, in the example of FIG. 2, only feature points of the model image 81 are used as the targets of matching with feature points of the input image 82 in the feature matching unit 73. In contrast, in the example of FIG. 6, the respective feature points of the self-modulated images 91-1 to 91-N are also encompassed in the targets. This point will be described in detail later in explanation of the processing of a step S44 in FIG. 13 to be described later.

Furthermore, although a recognition determination unit 74 may execute the same processing as existing processing (see FIG. 16), it is more preferable for the recognition determination unit 74 to execute another processing in which characteristics of the present invention are utilized, such as processing in FIG. 21 to be described later.

Examples of various kinds of processing in the image recognition device having the configuration of FIG. 6 will be described below with reference to FIGS. 7 to 21.

Figure 7:
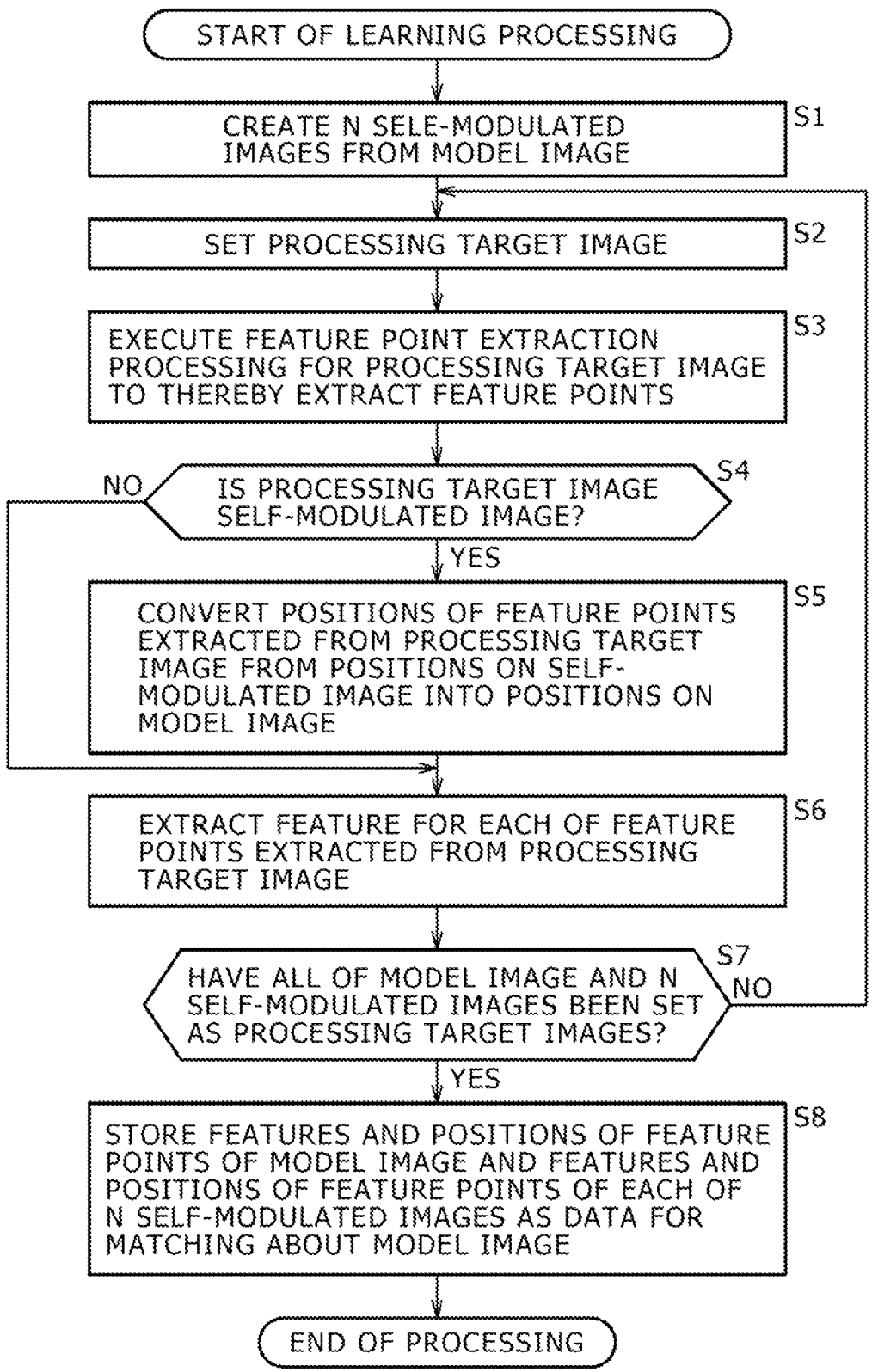
FIG. 7 is a flowchart for explaining an example of learning processing executed by the image recognition device of FIG. 6.

FIG. 7 is a flowchart for explaining one example of the processing executed by the learning part 101 (hereafter, referred to as learning processing).

As described above, not only one model image 81 but plural model images are given to the learning part 101. The learning processing of FIG. 6 is executed for every one of the plural model images. The following description is in accordance with the drawing, and thus is based on the premise that the model image 81 is given to the learning part 101.

In a step S1, the self-modulated image creator 111 creates the N self-modulated images 91-1 to 91-N from the model image 81.

In a step S2, the learning part 101 selects certain one image from the model image 81 and the self-modulated images 91-1 to 91-N that have not yet been subjected to processing of steps S3 to S6 to be described below, and sets the selected image as the processing target image.

In the step S3, the feature point extractor 61 or the feature point extractor 112 executes feature point processing for the processing target image to thereby extract feature points. Specifically, if the model image 81 is set as the processing target image, the processing of the step S3 is executed by the feature point extractor 61. In contrast, if one of the self-modulated images 91-1 to 91-N is set as the processing target image, the processing of the step S3 is executed by the feature point extractor 112. Details of the feature point extraction processing will be described later with reference to FIGS. 8 to 10.

In the step S4, the learning part 101 determines whether or not the processing target image is the self-modulated image 91.

If the model image 81 is set as the processing target image, the processing of the step S4 results in the determination "NO", and thus the processing sequence proceeds to the step S6.

In contrast, if the self-modulated image 91 is set as the processing target image, the processing of the step S4 results in the determination "YES", and thus the processing sequence proceeds to the step S5. In the step S5, the feature point position converter 113 converts the feature point positions of the respective feature points extracted from the self-modulated image 91 as the processing target image from positions on the self-modulated image 91 into the corresponding positions on the model image 81.

In the step S6, features are extracted from the respective feature points extracted from the processing target image in the processing of the step S3. The feature extraction processing in the step S6 is executed by the feature extractor 114 if the processing of the step S5 has been executed, or by the feature extractor 62 if the determination "NO" has been made in the processing of the step S4. Details of the step S6 will be described later with reference to FIGS. 11 and 12.

In a step S7, the learning part 101 determines whether or not all of the model image 81 and the self-modulated images 91-1 to 91-N have been set as the processing target image.

If the determination "NO" is made in the processing of the step S7, the processing sequence is returned to the step S2, followed by repetition of the subsequent processing.

If the loop processing from the step S2 to the step S7 has been repeatedly executed for all of the model image 81 and the self-modulated images 91-1 to 91-N, the determination "YES" is made in the processing of the step S7, and thus the processing sequence proceeds to a step S8.

In the step S8, the learning part 101 stores in the feature database 52 the features and the feature point positions of the respective feature points of the model image 81 and the features and the feature point positions (corresponding positions on the model image 81) of the respective feature points of each of the N self-modulated images 91-1 to 91-N.

The end of the step S8 is equivalent to the end of the learning processing for the model image 81.

A detailed example of the feature point extraction processing of the step S3 will be described below. For simple explanation, the following description is based on the premise that the operating entity is the feature pint extractor 61, and the horizontal direction and the vertical direction of an image are defined as the X-axis direction and the Y-axis direction, respectively.

The feature point extractor 61 sets the model image 81 as the feature point extraction target image, and first subjects the feature point extraction target image to smoothing filtering such as convolution (Gaussian filtering) based on a 2D Gaussian function expressed by Equation (1) and image reduction through bilinear interpolation resampling alternately and repeatedly, to thereby construct a multi-resolution pyramid structure of the image. As a resampling factor, σ employed in the Gaussian filter of Equation (1) is used.

$$g(x, y) = \frac{1}{2\pi\sigma^2} e^{-(x^2+y^2)/2\sigma^2} \quad (1)$$

Figure 8:
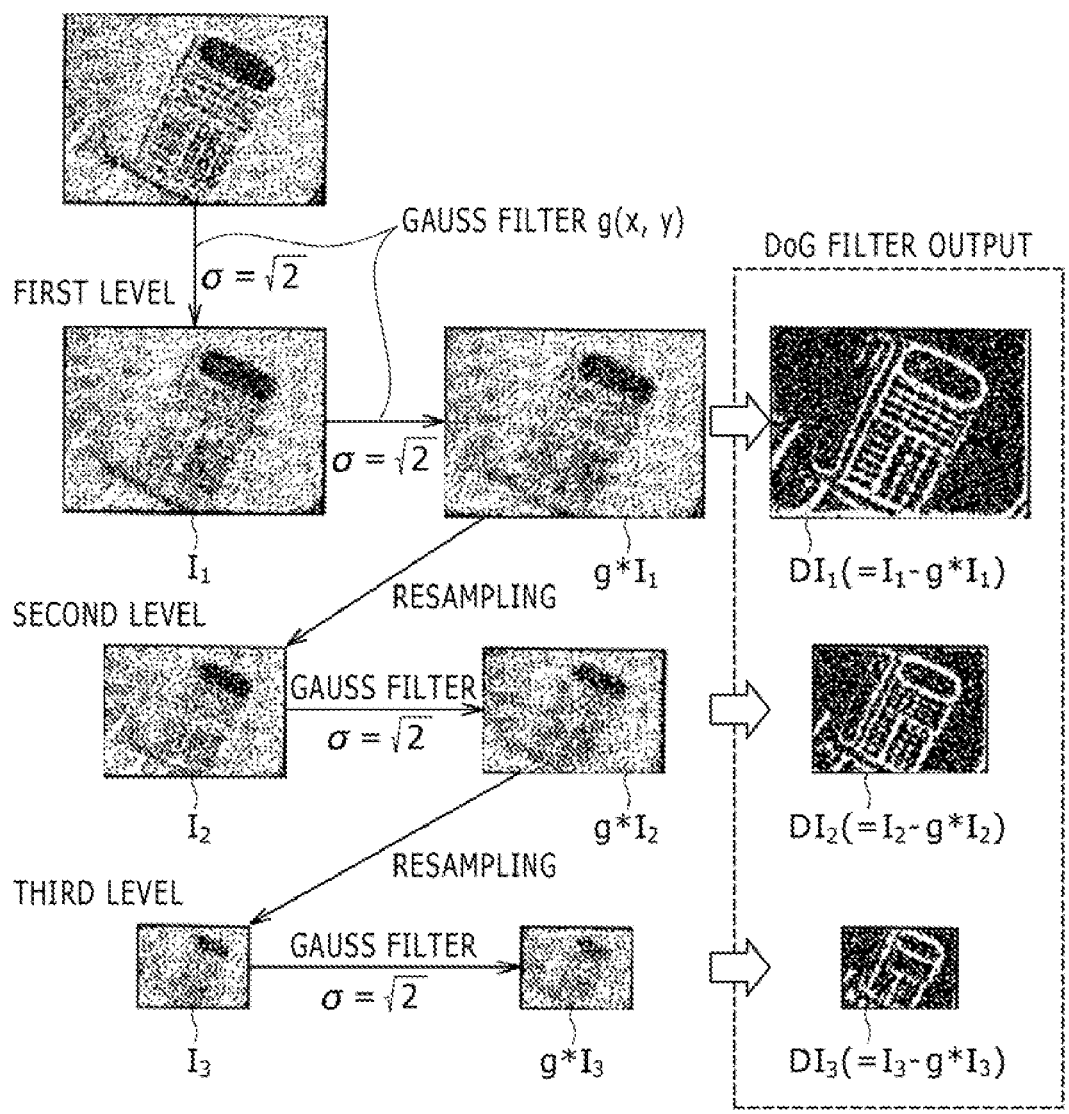
FIG. 8 is a diagram for explaining an example of feature point extraction processing in the learning processing of FIG. 7.

Specifically, as shown in FIG. 8, an input image I is subjected to a Gaussian filter g(x, y), employing σ=√2 to thereby create an image I1 at a first level (maximum resolution), and the image I1 is further subjected to the Gaussian filter to thereby create an image g*I1. Furthermore, the image g*I1 is subjected to resampling and then the Gaussian filter to thereby create images I2 and g*I2 at a second level, and images I3 and g*I3 at a third level are created from the image g*I2 in a similar manner.

Subsequently, the feature point extractor 61 applies a difference-of-Gaussian (DoG) filter to the images at the respective levels (resolutions). The DoG filter is one kind of a secondary differential filter used to highlight the outline of an image, and is frequently used as well as a Laplacian-of-Gaussian (LoG) filter as an approximate model of processing executed in a human visual system until information from a retina is relayed by a lateral geniculate body. An output through the DoG filter is easily obtained through subtraction between images output through two Gaussian filters. Specifically, as shown in FIG. 8, an image DI1 (=I1−g*I1) is obtained as an image at the first level, and images DI2 (=I2−g*I2) and DI3 (=I3−g*I3) are obtained as images at the second level and the third level, respectively.

Furthermore, of local points (local maxima and local minima) of the images DI1, DI2, DI3, . . . at the respective levels output through the DoG filter, points of which position does not change in resolution changes within a predetermined range are detected as feature points by the feature point extractor 61. This can realize matching between feature points that is robust against image scaling.

Figure 9:
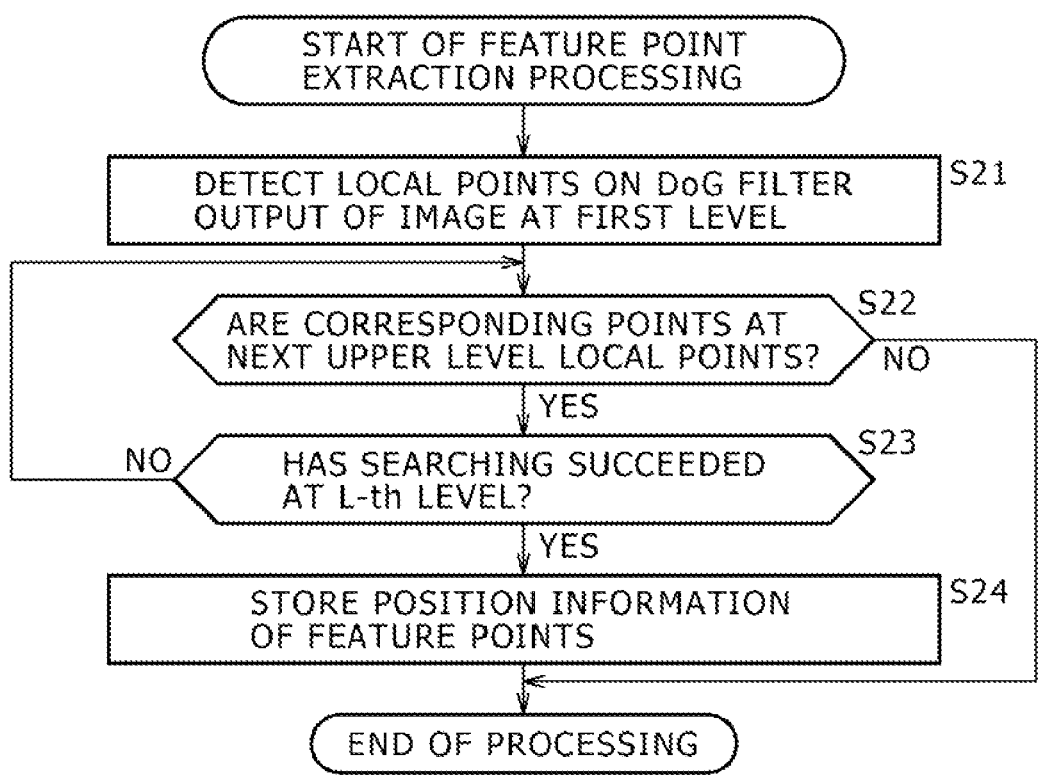
FIG. 9 is a flowchart for explaining an example of the feature point extraction processing in the learning processing of FIG. 7.
Figure 10:
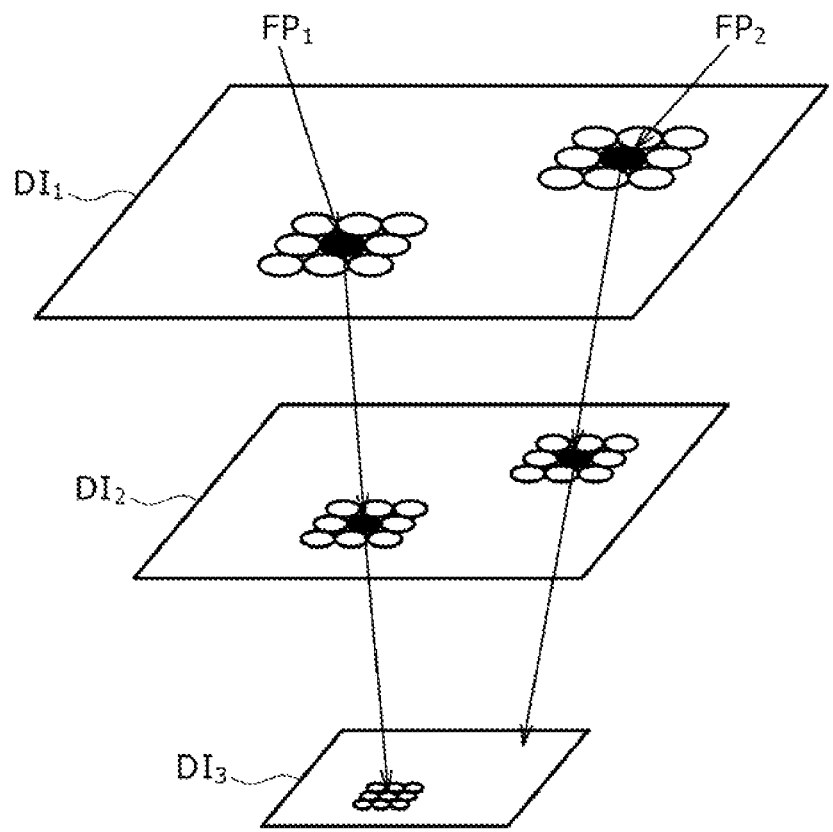
FIG. 10 is a diagram for explaining an example of the feature point extraction processing in the learning processing of FIG. 7.

With reference to the flowchart of FIG. 9, a description will be made below about one example of the feature point extraction processing for detection of feature points of which position does not change in resolution changes to the L-th level of the multi-resolution pyramid structure, i.e., to the factor of σ to the (L−1)-th power.

In a step S21, the feature point extractor 61 detects local points (local maxima and local minima) of the DoG filter output image DI1 at the first level (maximum resolution). As a local neighborhood, e.g. a 3×3 direct neighborhood can be used.

In a step S22, regarding the detected local points, the feature point extractor 61 obtains corresponding points at the next upper level (layer of the next lower resolution) with image reduction accompanying the resolution decrease taken into consideration, and then determines whether or not the corresponding points at the next upper level are local points.

If the corresponding points are not local points, the determination "NO" is made in the processing of the step S22, so that the feature point extraction processing is ended.

In contrast, if the corresponding points are local points, the processing of the step S22 results in the determination "YES", and thus the processing sequence proceeds to a step S23.

In the step S23, the feature point extractor 61 determines whether or not searching has succeeded at the L-th level.

If searching at the L-th level has not succeeded yet, the determination "NO" is made in the processing of the step S23, so that the processing sequence returns to the step S22, where searching at the further upper level is carried out.

If searching at the L-th level has succeeded, the feature point extractor 61 regards the local points as feature points and makes the determination "YES" in the processing of the step S23. Subsequently, in a step S24, the feature point extractor 61 holds the position information of the feature points.

The end of the step S24 is equivalent to the end of the feature point extraction processing.

Figure 20:
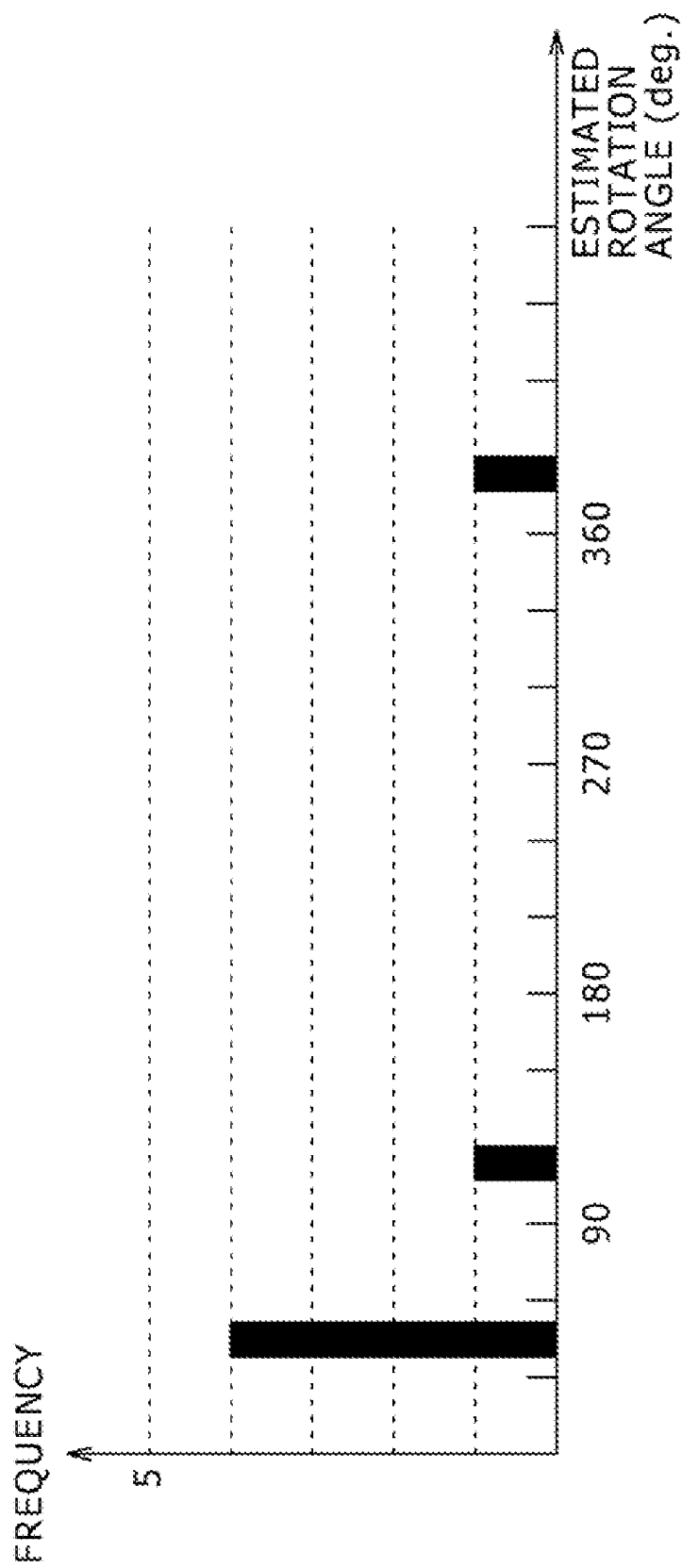
FIG. 20 is a diagram for explaining one method for the mismatch pair removal processing in the recognition processing of FIG. 13.

FIG. 20 shows an example of detection of feature points of which position does not change in resolution changes to the third level. In this example, of local points FP1 and FP2 detected on the first-level image DI1, the local point FP1, of which corresponding point exists both on the second-level and third-level images DI2 and DI3, is regarded as a feature point, while the local point FP2, of which corresponding point exists only on the second-level image, is not regarded as a feature point.

The feature point extractor 61 and so on may employ a LoG filter instead of a DoG filter. In addition, it is also possible to employ, instead of DoG filter outputs, output values of the corner-ness function used to detect corners of an object, described in Harris C. and Stephens M., "A combined corner and edge detector", in Proc. Alvey Vision Conf., pp. 147-151, 1988.

A description will be made below about a detailed example of the processing by the feature extractor 62, executed subsequently to the feature point extraction processing by the feature point extractor 61, i.e., the processing of the step S6 in FIG. 7.

As described above, the features extractor 62 extracts the feature of each of the feature points extracted by the feature point extractor 61, and stores the extracted features in the feature database 52. Used as the features is the density gradient information (gradient magnitude and gradient orientation) of the respective points in the neighboring area of each of the feature points derived from the image information of the images (Il, l=1, . . . , L) at the respective levels of the multi-resolution pyramid structure. The gradient magnitude Mx, y and the gradient orientation Rx, y of the point (x, y) are given by Equations (2) and (3), respectively.

$$M_{xy} = \sqrt{(I_{x+1,y} - I_{x,y})^2 + (I_{x,y+1} - I_{x,y})^2} \quad (2)$$

$$R_{x,y} = \tan^{-1}(I_{x,y+1} - I_{x,y}, I_{x+1,y} - I_{x,y}) \quad (3)$$

It is preferable to select, as the neighboring area of a feature point for feature calculation, an area that has a structure invariant to rotation and is symmetrical about the feature point. This can realize robustness against rotation. For example, the following schemes are available for the area selection: (i) an area within a radius of r pixels from a feature point is employed as the neighboring area of the feature point; and (ii) density gradients are multiplied by a 2D Gaussian weight that has a width σ centered at a feature point and is symmetrical about the feature point.

Figure 11:
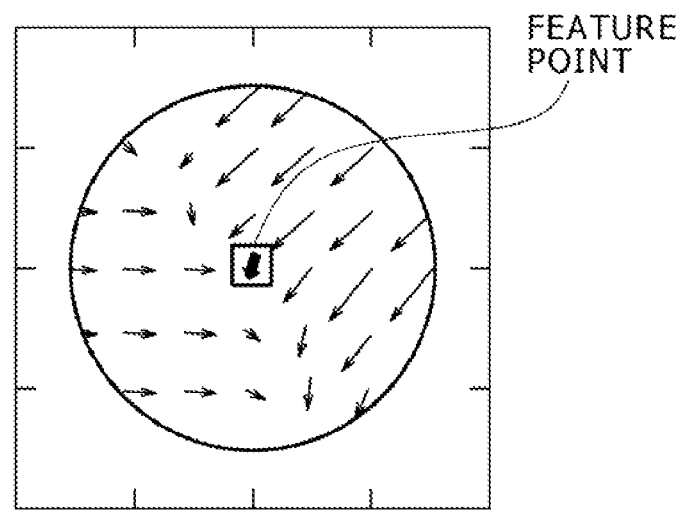
FIG. 11 is a diagram for explaining an example of the feature extraction processing in the learning processing of FIG. 7.

FIG. 11 shows an example of the density gradient information of a feature point neighboring area. In this example, an area within a radius of 3.5 pixels from a feature point is employed as the neighboring area. In FIG. 11, the length and direction of the arrowheads indicate the gradient magnitude and gradient orientation, respectively.

Figure 12:
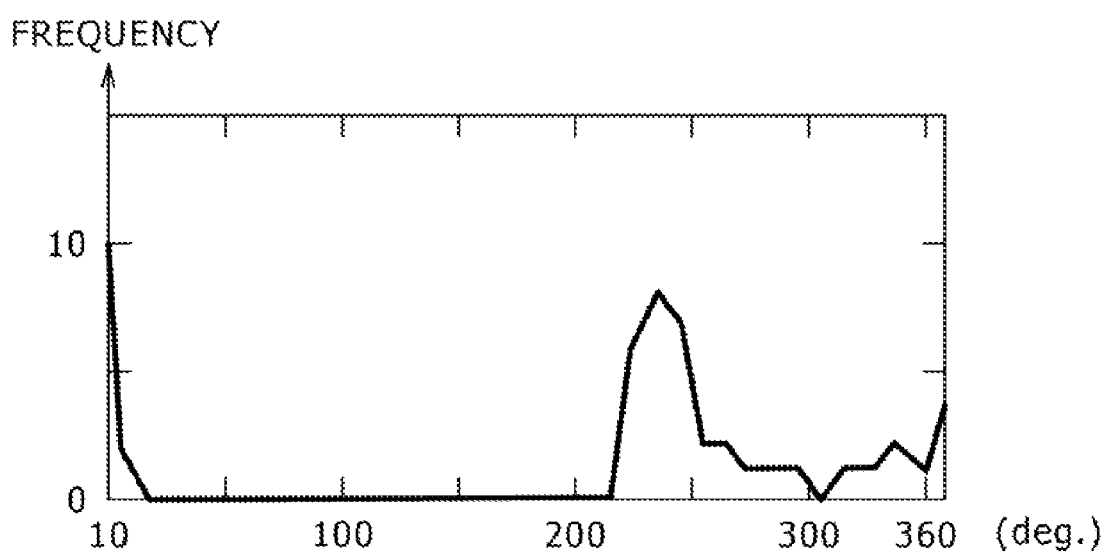
FIG. 12 is a diagram for explaining an example of the feature extraction processing in the learning processing of FIG. 7.

A histogram regarding the gradient orientations of a feature point neighborhood (orientation histogram) is also stored as the feature in the feature database 52 by the feature extractor 62. FIG. 12 shows an example of the gradient orientation histogram obtained from the density gradient information of FIG. 11. In FIG. 12, the class width Δθ is 10 deg and the number N of classes is 36 (=360 deg/10 deg).

After the above-described learning processing is executed and the data for matching about the respective model images such as the model image 81 are stored in the feature database 52, when the input image 82 is given to the recognition part 53 of FIG. 6, the recognition part 53 executes recognition processing in accordance with the flowchart of FIG. 13.

Specifically, in a step S41 of FIG. 13, the feature point extractor 71 executes feature point processing for the input image 82 to thereby extract feature points. Details of the feature point extraction processing are the same as those described above with reference to FIGS. 8 to 10.

In a step S42, the feature extractor 72 extracts the feature of each of the feature points extracted from the input image 82. Details of the step S42 are the same as those described above with reference to FIGS. 11 and 12.

In a step S43, the feature matching unit 73 sets a model image as the comparison target.

Specifically, as described above, only one model image 81 is given to the learning part 101 in the example of FIG. 6. However, in practice, plural model images are given to the learning part 101, and the data for matching regarding a respective one the plural model images are individually stored in the feature database 52. A certain one image of these plural model images is set as the comparison target in the processing of the step S43. The following description is based on the premise that the model image 81 is set as the comparison target for simple explanation.

In a step S44, the feature matching unit 73 executes matching processing with use of the object feature points of the input image 82 and the model feature points included in the data for matching about the model image 81 as the comparison target.

Details of the matching processing will be described later with reference to FIGS. 14 and 15. A noteworthy point of the matching processing is that the model feature points to be compared with the object feature points are the model feature points included in the data for matching about the model image 81, i.e., unlike the existing scheme, the model feature points to be compared encompass not only the model feature points of the model image 81 but also the model feature points of each of the N self-modulated images 91-1 to 91-N.

In a step S45, the recognition determination unit 74 executes recognition determination processing with use of a match pair group. Details of the recognition determination processing will be described later with reference to FIGS. 16 to 21.

In a step S46, the recognition part 53 determines whether or not the end condition has been satisfied.

If the end condition has not been satisfied yet, the determination "NO" is made in the processing of the step S46, so that the processing sequence is returned to the step S43, followed by repetition of the subsequent processing.

In contrast, if the end condition has been satisfied, the determination "YES" is made in the processing of the step S46, so that the recognition processing is ended.

There is not particular limitation on the end condition of the step S46. For example, completion of setting of all the model images as the comparison target may be the end condition. Alternatively, completion of detection of the same object from the input image 82 as a model object included in the model image set as the comparison target may be the end condition.

A detailed example of the matching processing of the step S44 of FIG. 13 will be described below with reference to the flowchart of FIG. 14.

In a step S61, the feature matching unit 73 compares the orientation histogram of each model feature point with the orientation histogram of each object feature point to thereby calculate the dissimilarities between the histograms and the estimated rotation angles between the model and object.

A noteworthy point of the step S61 is that the orientation histograms of the model feature points utilized in the step S61 encompass not only the orientation histograms of the model feature points of the model image 81 but also the orientation histograms of the model feature points of each of the N self-modulated images 91-1 to 91-N unlike the existing scheme.

When H1=(h1($n$), n=1, . . . , N) and H2=(h2($n$), n=1, . . . , N) denote two orientation histograms having the same class width $\Delta\theta$ and the same number N of classes and h1($n$) and h2($n$) denote the frequency of the class n, the distance d(H1, H2) between the histograms of H1 and H2 is given by Equation (4). As r in Equation (4), r=1, 2, ∞ is used in general.

$$d(H_1, H_2) = \left(\sum_i \|h_1(i) - h_2(i)\|^r\right)^{1/r} \quad (4)$$

The dissimilarities between the orientation histograms of the model feature point and the object feature point are calculated by using Equation (4). Regarding this calculation, there are the following two necessities. Specifically, (i) because the scale ratio between the model and the object is unknown at the timing of the matching, the orientation histogram matching needs to carried out between each level of a model feature point and each level of an object feature point. Furthermore, (ii) the rotational transformation amount between the model and the object needs to be taken into consideration regarding the matching between the orientation histograms.

A description will be made below about calculation of the dissimilarity between an orientation histogram Hm LV=(hm LV(n), n=1, . . . , N) of a level LV of a model feature point m and an orientation histogram Ho lv=(ho lv(n), n=1, . . . , N) of a level lv of an object feature point o. Because an orientation histogram cyclically changes in response to rotational transformation, the calculation in accordance with Equation (4) is so carried out that the class of the histogram Ho lv is cyclically shifted one by one at every calculation. The minimum value obtained through this repeated calculation is defined as the dissimilarity between the histogram Hm LV and Ho lv. The rotation angle of the object feature point can be estimated from the shift amount (the number of shifted classes) offering this minimum dissimilarity. This scheme is known as the orientation histogram intersection method.

When Ho lv(k) denotes the orientation histogram resulting from shifting of the histogram Ho lv by k classes, the dissimilarity between the orientation histograms obtained by the orientation histogram intersection method, expressed as dissimilarity (Hm LV, Ho lv(k)), is given by Equation (5).

$$\text{dissimilarity}(H_m^{LV}, H_o^{lv}) = \min_{k=0}^{N-1}(d(H_m^{LV}, H_o^{lv(k)})) \quad (5)$$

Furthermore, when k' denotes k offering the minimum d(Hm Lv, Ho lv(k)), the estimated rotation angle θ (m, LV, o, lv) of the neighboring area of the object feature point o is given by Equation (6).

$$\theta(m, LV, o, lv) = k'\Delta\theta \quad (6)$$

In terms of the above-described necessity (i), the dissimilarity between the orientation histograms of the model feature point m and the object feature point o, expressed as dissimilarity (Hm, Ho), is given by Equation (7).

$$\text{dissimilarity}(H_m, H_o) = \min_{LV, lv}(\text{dissimilarity}(H_m^{LV}, H_o^{lv})) \quad (7)$$

For each of pairs (m, o) between the model feature points m and the object feature points o, the feature matching unit 73 stores the minimum dissimilarity dissimilarity (Hm, Ho) between orientation histograms together with the levels LV and lv offering this minimum dissimilarity (hereinafter, represented as LVm* and lvo*, respectively) and the estimated rotation angle θ(m, LVm*, o, lvo*).

Subsequently, in a step S62, for each model feature point m, the feature matching unit 73 selects K object feature points om1, . . . , omK in the order of increasing dissimilarity between orientation histograms and make match pairs between the model feature point and the selected object feature points, to thereby create a match pair group. That is, for each model feature points m, K match pairs (m, om1), . . . , (m, omk), . . . , (m, omK) are made. Furthermore, for each match pair (m, omk), the information of the corresponding levels LVm* and lvomk* and the corresponding estimated rotation angle θ (m, LVm*, o, lvomk*) is held.

In this manner, the feature matching unit 73 does not accumulate gradient magnitudes for histogram frequencies but merely pays attention only on gradient orientations, which enables feature matching robust against luminosity changes. In addition, in the above-described scheme of Non-Patent Document 2, matching is carried out based on features for which extraction is unstable such as the canonical orientations. In contrast, in the present embodiment, more stable matching with consideration for the shapes of orientation histograms is possible. Moreover, a stable feature (estimated rotation angle) can be obtained secondarily.

In the above description, K match pairs are selected for each model feature point m in the processing of the step S62. However, the selecting way is not limited thereto, but all of pairs of which dissimilarity between orientation histograms is lower than a threshold value may be selected.

The match pair group created through the processing of the step S62 includes also match pairs of which feature points have similar orientation histograms but differ in the spatial characteristics of the density gradients. Therefore, in a step S63, the feature matching unit 73 refines the match pairs based on the similarity between density gradient vectors to thereby update the match pair group.

Specifically, assuming that Um denotes the density gradient vectors of the level LVm* of the neighborhood of a model feature point m while Uo denotes the density gradient vectors of the level lvomk* of the neighborhood of an object feature point o that forms a corresponding point pair with this model feature point m, match pairs of which similarity between the vectors Um and Uo is lower than a threshold value are discarded to thereby update the match pair group.

Figure 14:
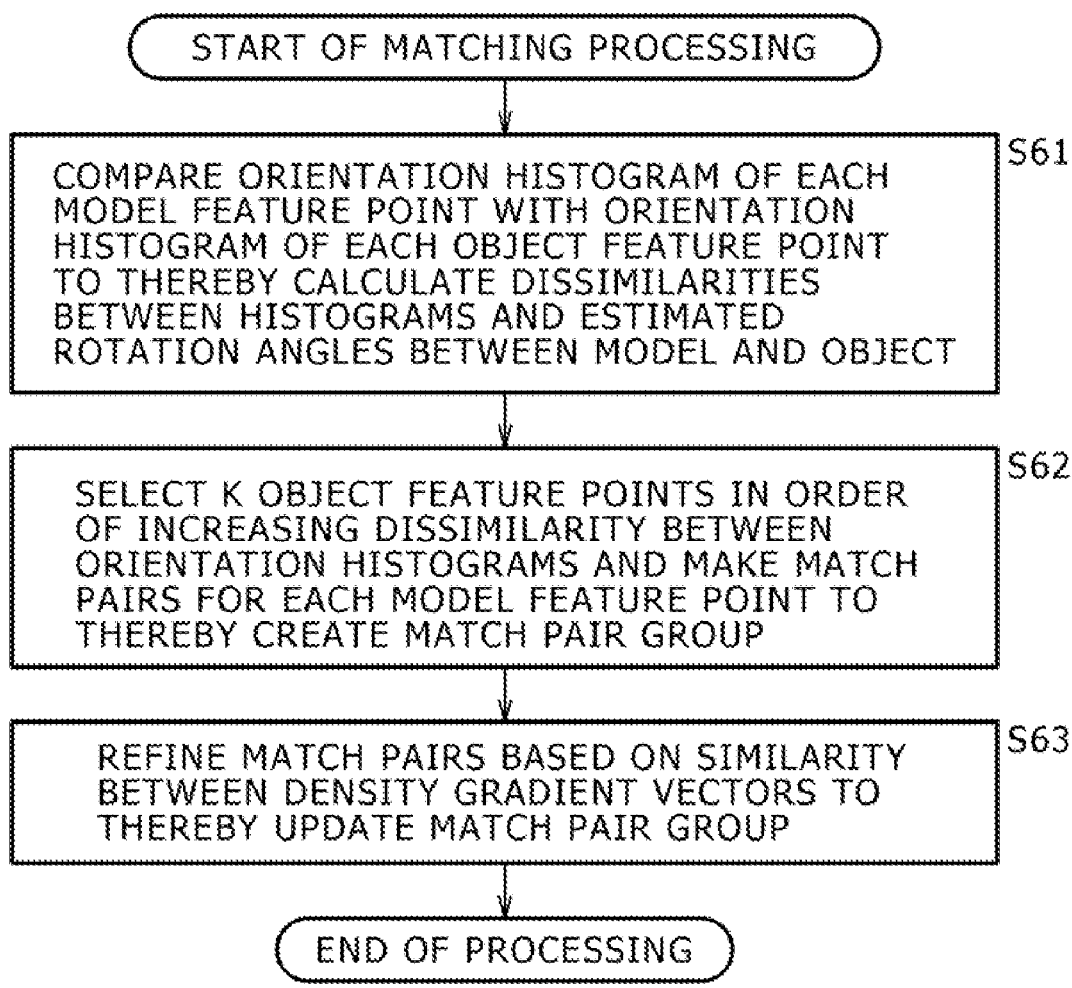
FIG. 14 is a flowchart for explaining an example of matching processing in the recognition processing of FIG. 13.
Figure 15:
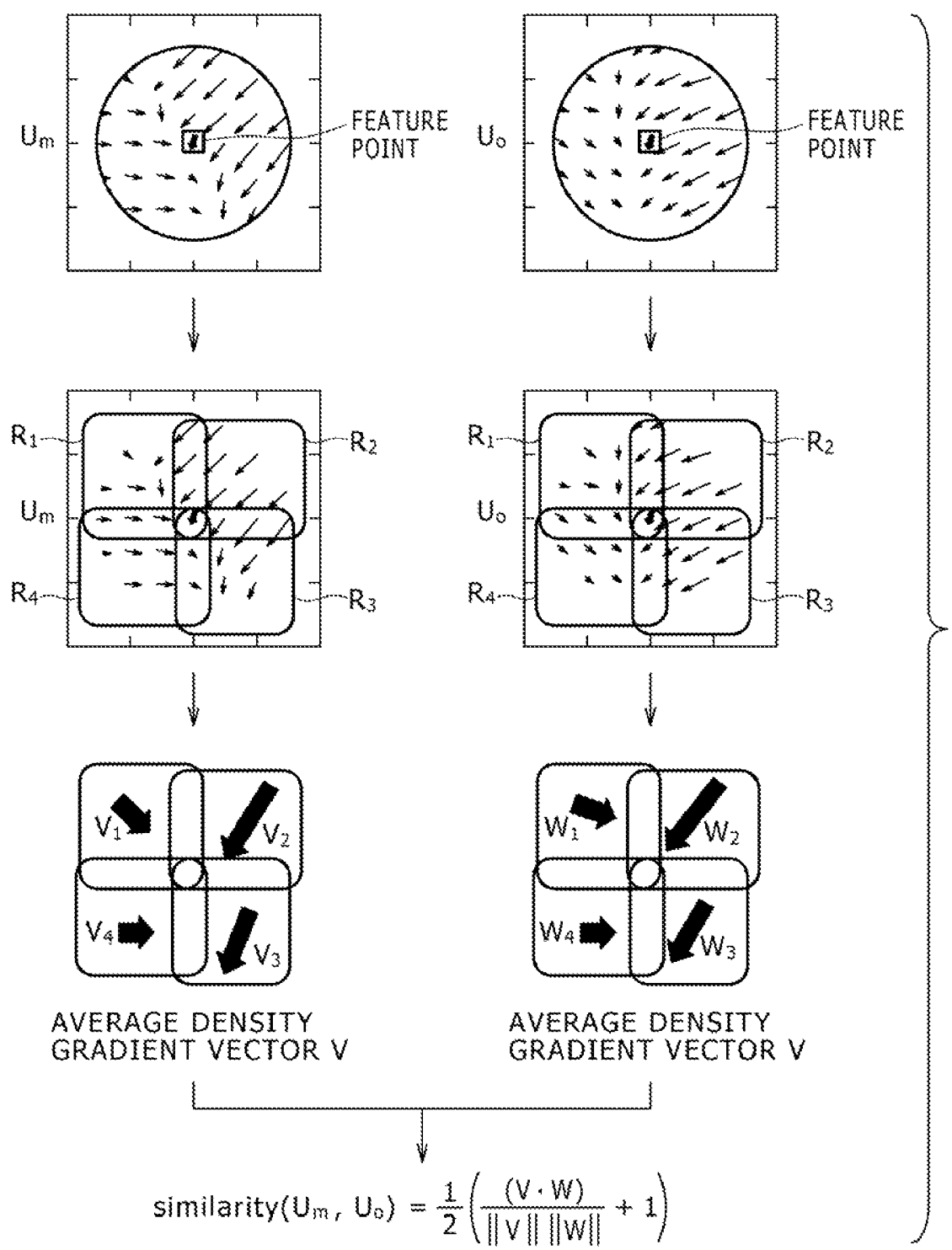
FIG. 15 is a diagram for explaining an example of the matching processing in the recognition processing of FIG. 13.

With reference to FIG. 14, a scheme of calculation of the similarity between the density gradient vectors Um and Uo will be described below. Initially, the feature matching unit 73 spatially separates the vectors Um into four regions Ri (i=1, . . . , 4) and obtains average density gradient vectors Vi (i=1, . . . , 4) of the respective regions. The vectors Um are expressed as an eight-dimensional vector V as a collection of the vectors Vi. In addition, in order to carry out matching of density gradient information with consideration for rotational transformation, the feature matching unit 73 corrects the gradient orientations of the vectors Uo by the estimated rotation angle θ (m, LVm*, o, lvomk*) obtained in advance, to thereby obtain vectors Uo*. In this calculation, the feature matching unit 73 uses bilinear interpolation to obtain the values of intermediate positions. Similarly to the operation for the vectors Um, the feature matching unit 73 spatially separates the vectors Uo* into four regions Ri (i=1, . . . , 4) and obtains average density gradient vectors Wi (i=1, . . . , 4) of the respective regions. The vectors Uo are expressed as an eight-dimensional vector W as a collection of the vectors Wi. The similarity between the vectors Um and Uo, expressed as similarity (Um, Uo) pressed as similarity (Um, Uo) ∈ [0, 1], is interpreted as the similarity between the average density gradient vectors V and W, and is obtained by using e.g. a cosine correlation value in accordance with Equation (8). That is, the feature matching unit 73 executes arithmetic operation of Equation (8). In Equation (8), symbol (V.W) denotes the inner product of the vectors V and W.

$$\text{similarity}(U_m, U_o) = \frac{1}{2}\left(\frac{(V \cdot W)}{\|V\|\|W\|} + 1\right) \quad (8)$$

The feature matching unit 73 obtains the similarity between average density gradient vectors represented by Equation (8) for each match pair, and eliminates match pairs having a similarity lower than a threshold value δ from the match pair group to thereby update the match pair group.

In this manner, the feature matching unit 73 compares features by using average density gradient vectors in partial areas, and thus can realize matching robust against changes of density gradient information due to slight shifts of feature point positions and estimated rotation angles, and luminosity changes. In addition, the calculation amount can be reduced.

Through the above-described matching processing, the match pair group including match pairs between model feature points and object feature points that have similar local density gradient information of feature point neighborhoods is extracted by the feature matching unit 73, followed by being provided to the recognition determination unit 74 of FIG. 6. That is, the processing of the step S44 in the above-described recognition processing of FIG. 13 is ended.

Subsequently, as described above, the recognition determination processing is executed by the recognition determination unit 74 in the next step S45.

The algorithm of the recognition determination processing itself is not particularly limited as long as it employs the match pair group. As examples of the algorithm, the algorithm of the recognition determination processing applied to the existing recognition determination unit 74 of FIG. 2 and the algorithm of recognition determination processing newly invented by the present inventors will be described below. When there is a need to differentiate the former recognition determination processing from the latter processing, the former will be referred to as an old recognition determination processing while the latter as a new recognition determination processing.

Figure 16:
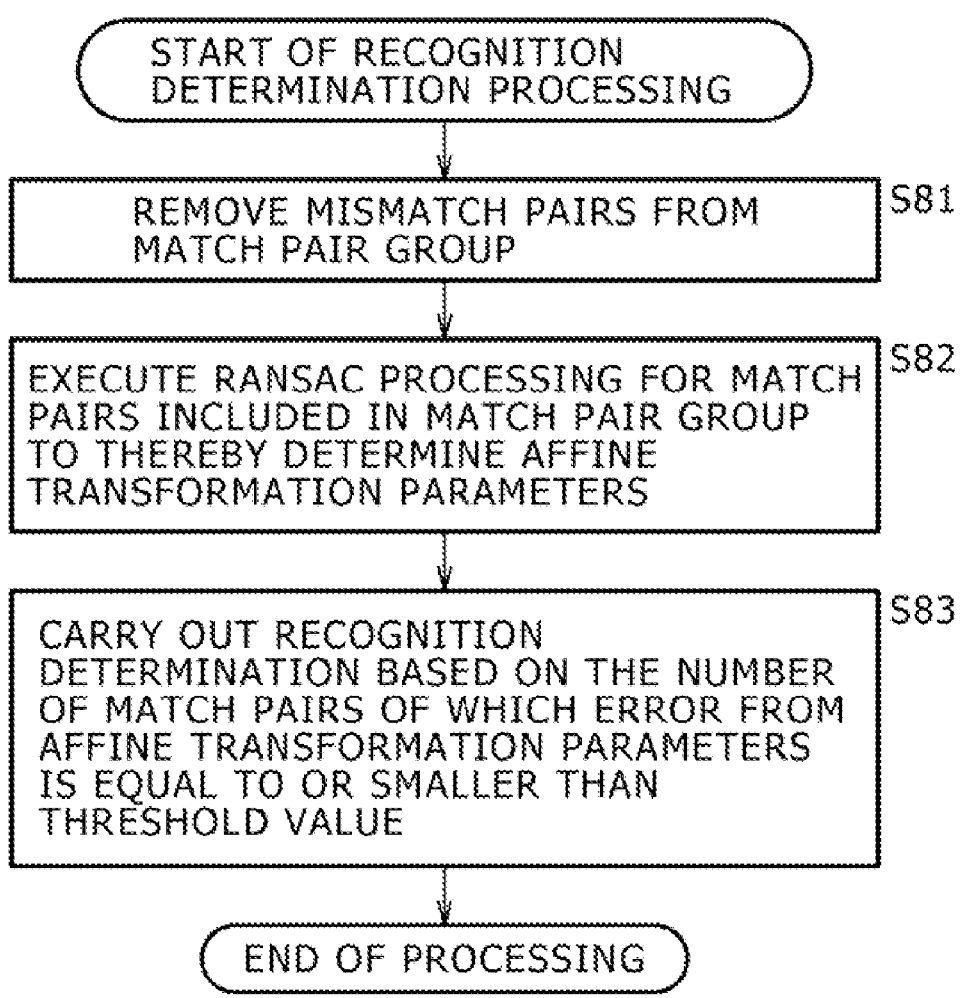
FIG. 16 is a flowchart for explaining one example of recognition determination processing in the recognition processing of FIG. 13.

FIG. 16 is a flowchart for explaining the old recognition determination processing.

In a step S81, the recognition determination unit 74 moves mismatch pairs from a match pair group. The significance of the processing of the step S81 will be described later.

In a step S82, the recognition determination unit 74 executes RANSAC processing for match pairs included in the match pair group to thereby determine affine transformation parameters. Details of the RANSAC processing will be described later.

In a step S83, the recognition determination unit 74 carries out recognition determination based on the number of match pairs of which error from the affine transformation parameters is equal to or smaller than a threshold value.

The end of the step S83 is equivalent to the end of the recognition determination processing.

Details of the RANSAC processing of the step S82 will be described below.

The match pair group at the timing immediately after the provision thereof from the feature matching unit 73 to the recognition determination unit 74 includes, macroscopically, "false match pairs (outliers)" of which corresponding feature points have a spatial positional relationship inconsistent with the pose of the model on the input image 82 (model pose).

When the match pair group includes three or more match pairs, it is possible to estimate approximate affine transformation parameters by least-squares estimation. Thus, the model pose can be recognized through repetition of operation of eliminating match pairs that involve a spatial positional relationship inconsistent with the estimated model pose and carrying out the model pose estimation again with use of the remaining match pairs.

However, it is known that an unsatisfactory result is generally obtained as the estimation result of least-squares estimation when a large number of outliers are included in a match pair group or when there is an outlier extremely departing from true affine transformation parameters (refer to Hartley R., Zisserman A., "Multiple View Geometry in Computer Vision", Chapter 3, pp. 69-116, Cambridge University Press, 2000). Therefore, the recognition determination unit 74 of the present embodiment extracts "true match pairs (inliers)" based on the spatial position relationship of the match pair group under the affine transformation constraint. Furthermore, with use of the extracted inliers, the recognition determination unit 74 executes a series of processing for determining affine transformation parameters as the model pose, i.e., affine transformation parameters that determine the translation amount, rotation, scaling, and stretch. The series of processing is referred to as the RANSAC processing.

As described above, the affine transformation parameters cannot be determined unless a match pair group includes three or more match pairs. Therefore, when the number of match pairs is two or less, the recognition determination unit 74 makes a determination that no model exists in the input image 82 or the model pose detection has failed. Consequently, the recognition determination unit 74 outputs an indication that "recognition is impossible" and ends the RANSAC processing. In contrast, when the number of match pairs is three or more, the recognition determination unit 74 makes a determination that the model pose detection is possible, and carries out estimation of the affine transformation parameters. The recognition determination unit 74 estimates the model pose based on the spatial positions of feature points of the model image 81 and the input image 82 at e.g. the first level (maximum resolution).

The affine transformation of a model feature point $[x\ y]T$ to an object feature point $[u\ v]T$ is expressed by Equation (9).

$$\begin{bmatrix} u \\ v \end{bmatrix} = \begin{bmatrix} a_1 & a_2 \\ a_3 & a_4 \end{bmatrix} \begin{bmatrix} x \\ y \end{bmatrix} + \begin{bmatrix} b_1 \\ b_2 \end{bmatrix} \tag{9}$$

In Equation (9), $a_i$ ($i=1, \ldots, 4$) denote parameters determining rotation, scale, and stretch, and $[b_1\ b_2]T$ denotes translation parameters. The number of the affine transformation parameters that should be determined is six: $a_1, \ldots, a_4$, and $b_1$ and $b_2$. Therefore, the existence of three match pairs permits the determination of the affine transformation parameters.

When a pair group P composed of three match pairs is represented by $([x_1\ y_1]T, [u_1\ v_1]T)$, $([x_2\ y_2]T, [u_2\ v_2]T)$, and $([x_3\ y_3]T, [u_3\ v_3]T)$, the relationship between the pair group P and the affine transformation parameters can be expressed by the linear system shown by Equation (10).

$$\begin{bmatrix} x_1 & y_1 & 0 & 0 & 1 & 0 \\ 0 & 0 & x_1 & y_1 & 0 & 1 \\ x_2 & y_2 & 0 & 0 & 1 & 0 \\ 0 & 0 & x_2 & y_2 & 0 & 1 \\ x_3 & y_3 & 0 & 0 & 1 & 0 \\ 0 & 0 & x_3 & y_3 & 0 & 1 \end{bmatrix} \begin{bmatrix} a_1 \\ a_2 \\ a_3 \\ a_4 \\ b_1 \\ b_2 \end{bmatrix} = \begin{bmatrix} u_1 \\ v_1 \\ u_2 \\ v_2 \\ u_3 \\ v_3 \end{bmatrix} \tag{10}$$

When Equation (10) is rewritten to a form of Ax=b, the least-squares solution of the affine transformation parameters x is given by Equation (11).

$$x = A^{-1}b \tag{11}$$

When the pair group P is so selected from a match pair group repeatedly at random that at least one outlier is included in the selected pair group P, the obtained affine transformation parameters are projected onto a parameter space in a scattered manner. In contrast, when the pair group P composed only of inliers is selected repeatedly at random, all of the obtained affine transformation parameters are extremely similar to the true affine transformation parameters of the model pose, i.e., are close to each other on a parameter space. Consequently, when the operation of randomly selecting the pair group P from a match pair group and projecting the obtained affine transformation parameters on the parameter space is repeated, inliers form a cluster having a high density (a large number of members) on the parameter space, while outliers appear in a scattered manner. Therefore, when clustering is carried out on the parameter space, the elements in the cluster with the largest number of members can be regarded as inliers.

Figure 17:
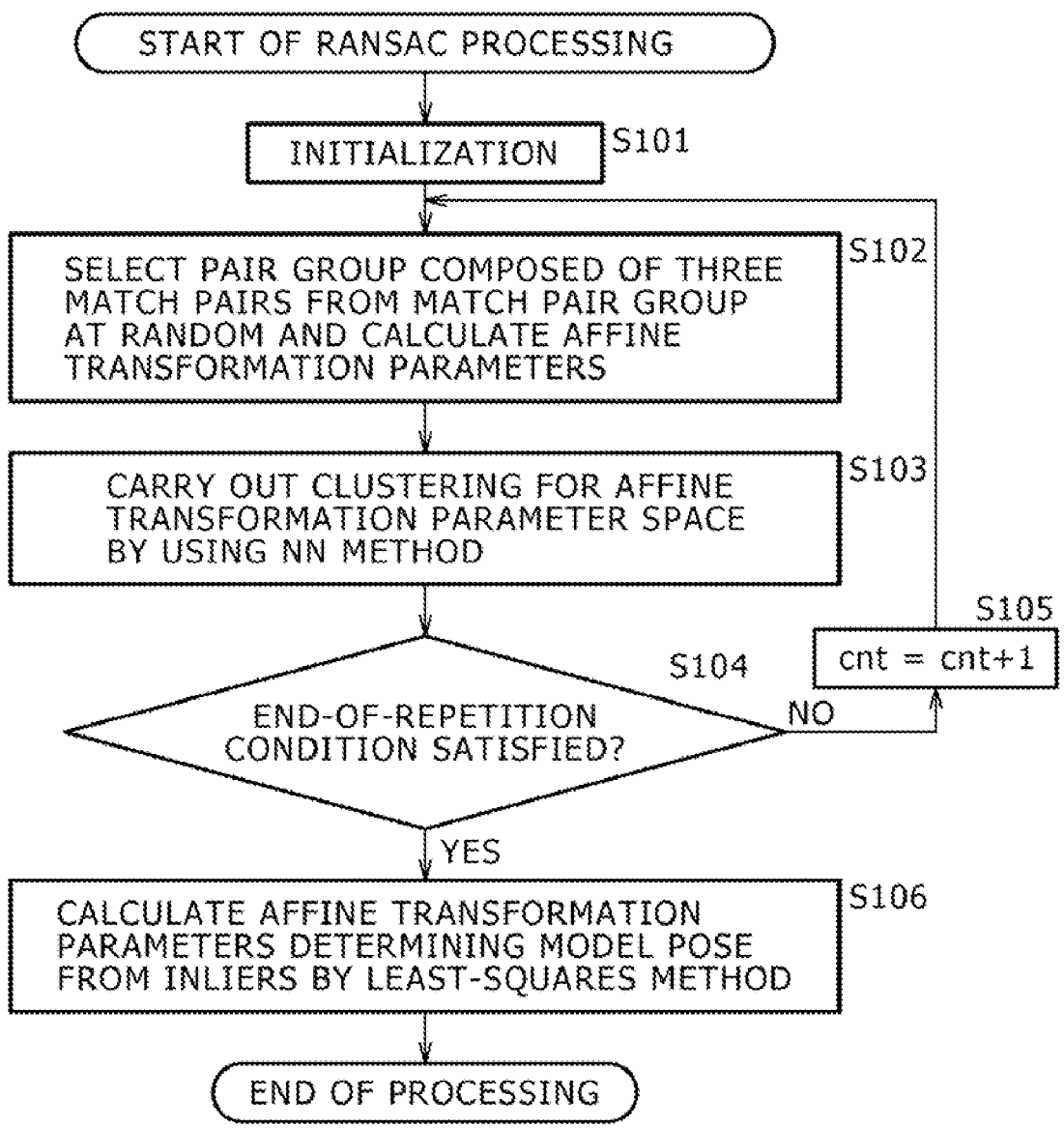
FIG. 17 is a flowchart for explaining one example of RANSAC processing in the recognition processing of FIG. 13.
Figure 18:
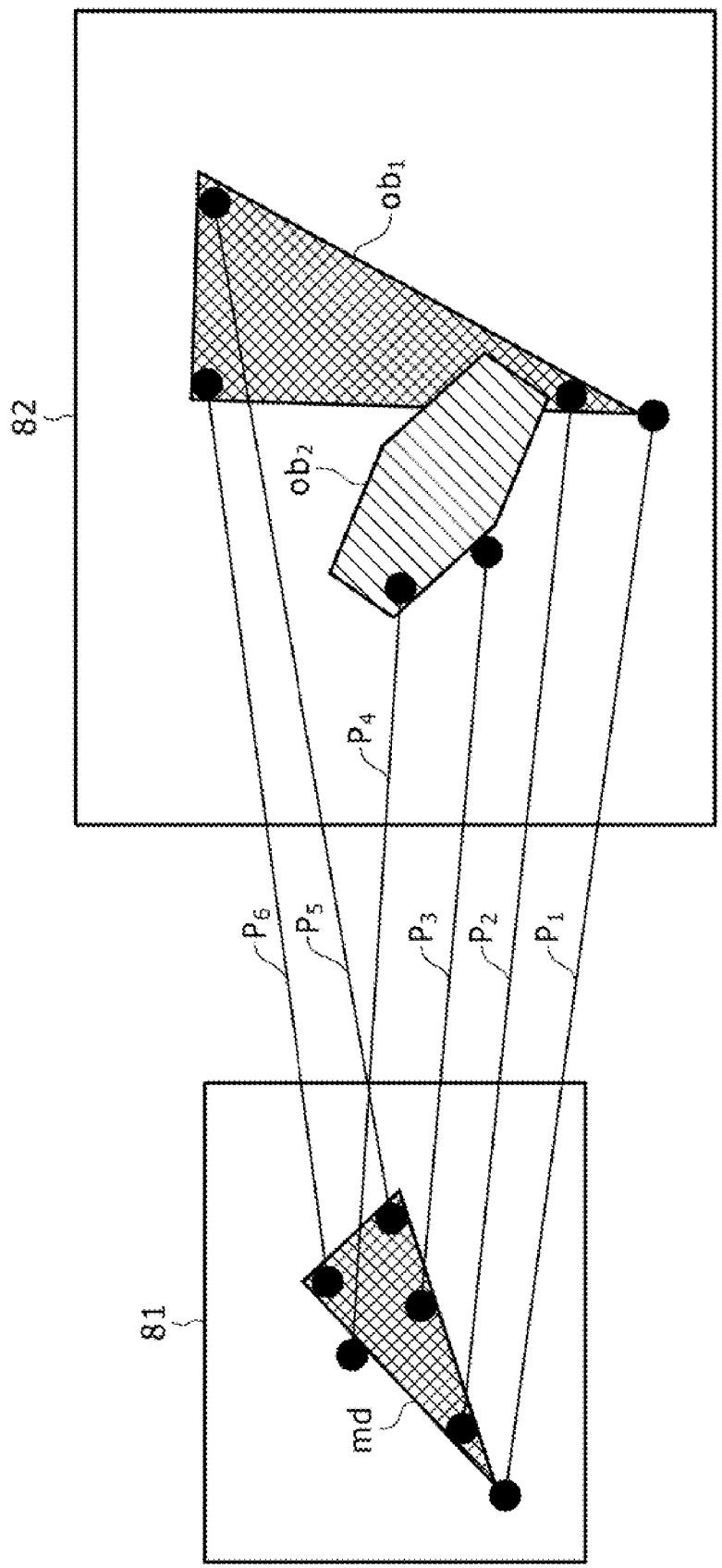
FIG. 18 is a diagram for explaining one method for mismatch pair removal processing in the recognition processing of FIG. 13.

FIG. 17 is a flowchart for explaining one example of such RANSAC processing.

In the example of FIG. 17, the nearest neighbor (NN) method is used as the method for clustering by the recognition determination unit 74. The above-described parameters b1 and b2 can take any various values depending on the recognition target image. Therefore, also in clustering in the x space, selection of the clustering threshold value depends on the recognition target. To address this, under an assumption that "there is almost no pair group P that offers affine transformation parameters of which parameters a1, . . . , a4 are similar to true parameters but parameters b1 and b2 are different from true parameters", the recognition determination unit 74 carries out clustering only on the parameter space made by the parameters a1, . . . , a4 (hereinafter, represented as a). Even when a situation where this assumption does not hold true occurs, problems can be easily avoided by carrying out clustering in the parameter space made by the parameters b1 and b2 independently of the clustering in the a space and taking the clustering result into consideration.

In a step S101, the recognition determination unit 74 carries out initialization. Specifically, the recognition determination unit 74 sets a count value cnt for the number of repetitions to one, and randomly selects a pair group P1 from a match pair group to find affine transformation parameters a1. In addition, the recognition determination unit 74 sets the number N of clusters to one, and makes a cluster C1 centered at the parameters a1 on the affine transformation parameter space a. Furthermore, the recognition determination unit 74 sets a centroid c1 of this cluster C1 to a1, and sets the number nc1 of members to one.

In a step S102, the recognition determination unit 74 randomly selects a pair group Pcnt composed of three match pairs from the match pair group and calculates affine transformation parameters acnt.

In a step S103, the recognition determination unit 74 carries out clustering in the affine transformation parameter space by using the NN method. Specifically, the recognition determination unit 74 initially finds the minimum distance dmin among the distances d(acnt, ci) between the affine transformation parameters acnt and the centroids ci ($i=1, \ldots, N$) of the respective clusters Ci in accordance with Equation (12).

$$d_{min} = \min_{1 \leq i \leq N} [d(a_{cnt}, c_i)] \tag{12}$$

Subsequently, if the minimum distance dmin is smaller than a predetermined threshold value τ (e.g., τ=0.1), the recognition determination unit 74 causes the parameters acnt to belong to the cluster Ci offering the minimum distance dmin, and updates the centroid ci of the cluster Ci based on all the members including the parameters acnt. In addition, the recognition determination unit 74 sets the number nci of members in the cluster Ci to nci+1. In contrast, if the minimum distance dmin is equal to or larger than the threshold value τ, the recognition determination unit 74 sets the number N of clusters to N+1, and makes a new cluster CN+1 that includes the parameters acnt as its centroid cN+1 on the affine transformation parameter space a. Furthermore, the recognition determination unit 74 sets the number ncN+1 of members to one.

In a step S104, the recognition determination unit 74 determines whether or not the end-of-repetition condition has been satisfied.

The end-of-repetition condition of the step S104 is not particularly limited but may be any. Specifically, e.g. the following situation can be employed as the end-of-repetition condition so that the processing may be ended if the situation has occurred: the largest number of members is larger than a predetermined threshold value (e.g., 15) and the difference between the largest number of members and the second largest number of members is larger than a predetermined threshold value (e.g., 3); or the count value cnt of the counter for the number of repetitions is larger than a predetermined threshold value (e.g., 5000).

If it is determined in the step S104 that the end-of-repetition condition has not been satisfied, the recognition determination unit 74 sets the count value cnt for the number of repetitions to cnt+1 in a step S105, and then returns the processing sequence to the step S102 for repetition of the processing.

In contrast, if it is determined in the step S104 that the end-of-repetition condition has been satisfied, the processing sequence proceeds to a step S106.

In the step S106, by using the inliers obtained through the above-described processing, the recognition determination unit 74 calculates the affine transformation parameters that determine the model pose by the least-squares method.

When the inliers are represented as ([xIN1 yIN1]T, [uIN1 vIN1]T), ([xIN2 yIN2]T, [uIN2 vIN2]T), ..., the relationship between the inliers and the affine transformation parameters can be represented by the linear system shown by Equation (13).

$$\begin{bmatrix} x_{IN1} & y_{IN1} & 0 & 0 & 1 & 0 \\ 0 & 0 & x_{IN1} & y_{IN1} & 0 & 1 \\ x_{IN2} & y_{IN2} & 0 & 0 & 1 & 0 \\ 0 & 0 & x_{IN2} & y_{IN2} & 0 & 1 \\ & & \cdots & & & \\ & & \cdots & & & \end{bmatrix} \begin{bmatrix} a_1 \\ a_2 \\ a_3 \\ a_4 \\ b_1 \\ b_2 \end{bmatrix} = \begin{bmatrix} u_{IN1} \\ v_{IN1} \\ u_{IN2} \\ v_{IN2} \\ \vdots \\ \vdots \end{bmatrix} \quad (13)$$

When Equation (13) is rewritten to a form of AIN×IN=bIN, the least-squares solution of the affine transformation parameters xIN is given by Equation (14).

$$X_{IN} = (A_{IN}^T A_{IN})^{-1} A_{IN}^T b_{IN} \quad (14)$$

By use of the thus calculated affine transformation parameters xIN, the above-described recognition determination of the steps S83 of FIG. 16 are carried out, so that the recognition determination result is output as the recognition result 83 (FIG. 6).

In the above-described processing, the threshold value τ is a constant value. However, it is also possible to employ a scheme like so-called "simulated annealing" for the loop processing of the steps S102 to S105. Specifically, in this scheme, rough extraction of inliers is carried out with use of a comparatively large threshold value τ in the beginning, followed by adoption of a threshold value τ that gradually decreases as the number of repetitions increases. This scheme enables accurate extraction of inliers.

Furthermore, in the above-described processing, the operation of randomly selecting the pair group P composed of three match pairs from a match pair group and projecting the obtained affine transformation parameters on a parameter space is repeated. Subsequently, by using elements in the cluster having the largest number of members on the parameter space as inliers, the affine transformation parameters that determine the model pose are estimated by the least-squares method. However, the processing is not limited thereto. For example, the centroid of the cluster having the largest number of members may be regarded as the affine transformation parameters that determine the model pose.

The larger the ratio of outliers in a match pair group created by the feature matching unit 73 of FIG. 6 is, the lower the probability of selection of inliers by the recognition determination unit 74 is. A lower selection probability requires a larger number of repetitions in the model pose estimation, which results in a longer calculation time. Therefore, it is desirable that outliers are removed as much as possible from the match pair group at the stage immediately after the provision thereof from the feature matching unit 73 to the recognition determination unit 74. For this reason, in the old recognition determination processing of FIG. 16, mismatch pairs as outliers are removed in the processing of the step S81 previous to the processing of the step S82. This is the significance of the processing of the step S81. For the same purpose, the new recognition determination processing of FIG. 21 to be described later also includes a step S121.

There is no particular limitation on the method for removing the mismatch pairs (outliers). For example, a first removal method or second removal method to be described below can be employed.

The first removal method refers to a method that enables the recognition determination unit 74 to realize a series of processing to be described below.

Specifically, the recognition determination unit 74 creates an estimated rotation angle histogram for selection of match pairs. A specific description will be made below about matching shown in FIG. 18 between the model image 81 including a model md and the input image 82 including objects ob1 and ob2. The feature matching unit 73 creates match pair group including match pairs P1, . . . , P6 shown in FIG. 18 between model feature points m and object feature points o. Of these match pairs, the pairs P1, P2, P5, and P6 are inliers while the pairs P3 and P4 are outliers.

For each of the match pairs created by the feature matching unit 73, the information of the estimated rotation angle of the model on the input image 82 is stored. As shown in FIG. 19, all the inliers have close estimated rotation angles (e.g., 40 deg) while the outliers have various estimated rotation angles (e.g., 110 deg and 260 deg). Consequently, if an estimated rotation angle histogram like that shown in FIG. 20 is created, match pairs having the estimated rotation angle corresponding to the peak in the histogram can be regarded as inliers (and an extremely small number of outliers having the same estimated rotation angle as that of the inliers).

Therefore, the recognition determination unit 74 selects match pairs having the estimated rotation angle corresponding to the peak in the estimated rotation angle histogram from the match pair group created by the feature matching unit 73. In other words, the recognition determination unit 74 removes match pairs other than the selected match pairs as mismatch pairs.

The method permitting realization of the above-described series of processing is the first removal method.

The first removal method makes it possible to estimate the affine transformation parameters of the model pose stably and accurately. However, if stretch transformation of a model is significant, the rotation angles of the respective points in an image are not constant. Therefore, the first removal method is effective only when there is no need to consider significant stretch transformation.

In contrast to the first removal method, the second removal method refers to a method that enables the recognition determination unit 74 to realize a series of processing to be described below.

Specifically, the recognition determination unit 74 carries out coarse estimation of the model pose by using the generalized Hough transform. More specifically, for the match pair group created by the feature matching unit 73, the recognition determination unit 74 carries out the generalized Hough transform with use of the characteristic space (voting space) formed of four image transformation parameters about rotation, scaling, and translation (x and y directions). The coarsely-estimated model pose on the input image 82 is determined based on the image transformation parameters of the largest vote count (most-voted parameters). Furthermore, match pairs that have voted on the most-voted parameters are regarded as inliers (and an extremely small number of outliers) that support this coarsely-estimated model pose.

Therefore, the recognition determination unit 74 selects the match pairs that have voted on the most-voted parameters. In other words, the recognition determination unit 74 removes match pairs other than the selected match pairs as mismatch pairs.

The method permitting realization of the above-described series of processing is the second removal method.

The second removal method makes it possible to estimate the affine transformation parameters of the model pose stably and accurately.

It is also possible to combine the above-described first and second removal methods.

The execution of the above-described old recognition determination processing of FIG. 16 can offer advantages of permitting detection of a model even from the input image 82 that includes plural objects partially overlapping with each other, and of ensuring robustness against a viewpoint change (image transformation including translation, scaling, rotation, and stretch), luminosity change, and deformation of image information due to noise.

Figure 21:
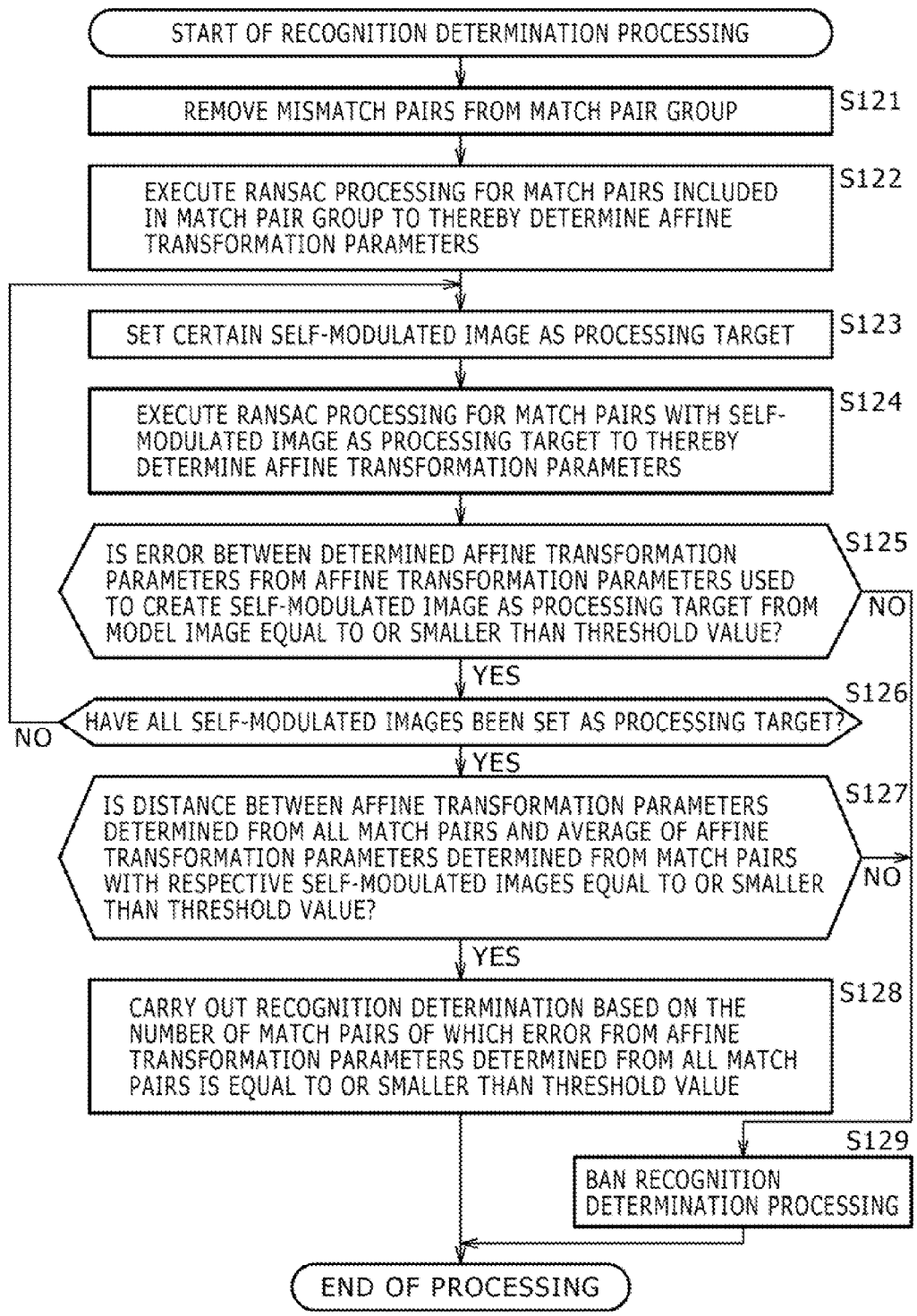
FIG. 21 is a flowchart for explaining one example of the recognition determination processing in the recognition processing of FIG. 13, as an example different from the example of FIG. 16.

Moreover, the advantages become more obvious through execution of the new recognition determination processing that utilizes the characteristic of the present invention that not only the information of the model image 81 but also the information of the N self-modulated images 91-1 to 91-N is used, i.e., the new recognition determination processing shown in FIG. 21. The new recognition determination processing of FIG. 21 will be described below.

The example of FIG. 21 is based on the premise that known N-set affine transformation parameters are employed as the N transformation coefficients of the self-modulated image creator 111 of FIG. 6. Specifically, the example of FIG. 21 is based on the premise that the self-modulated image creator 111 subjects the model image 81 to affine transformation with use of the known N-set affine transformation parameters and, as a result, the N self-modulated images 91-1 to 91-N are obtained.

The processing of the steps S121 and S122 of FIG. 21 is basically the same as that of the above-described steps S81 and S82 of FIG. 16. Therefore, the processing of the step S123 and the subsequent steps will be described below.

Specifically, in the step S123, the recognition determination unit 74 sets a certain self-modulated image 91 as the processing target. The "certain self-modulated image 91" refers to one image that has not been processed yet of the N self-modulated images 91-1 to 91-N.

In a step S124, the recognition determination unit 74 executes RANSAC processing for match pairs with the self-modulated image 91 a the processing target to thereby determine affine transformation parameters. The "match pairs with the self-modulated image 91 as the processing target" refer to match pairs including model feature points extracted from the self-modulated image 91 as the processing target.

In a step S125, the recognition determination unit 74 determines whether or not the error between the determined affine transformation parameters and the affine transformation parameters used to create the self-modulated image 91 as the processing target from the model image 81 is equal to or smaller than threshold value. The "affine transformation parameters used to create the self-modulated image 91 as the processing target from the model image 81" refer to certain one-set parameters of the above-described known N-set affine transformation parameters.

If it is determined in the step S125 that the error is larger than the threshold value, the recognition determination unit 74 bans the recognition determination processing in a step S129. That is, the recognition determination processing is ended.

In contrast, if it is determined in the step S125 that the error is equal to or smaller than the threshold value, the processing sequence proceeds to a step S126.

In the step S126, the recognition determination unit 74 determines whether or not all of the self-modulated images 91-1 to 91-N have been set as the processing target.

If the self-modulated images 91-1 to 91-N include an image that has not yet been set as the processing target, the determination "NO" is made in the processing of the step S126, so that the processing sequence is returned to the step S123, followed by repetition of the subsequent processing.

If the loop processing of the steps S123 to S126 has been repeatedly executed for all of the self-modulated images 91-1 to 91-N, the determination "YES" is made in the processing of the step S126, and thus the processing sequence proceeds to a step S127.

In the step S127, the recognition determination unit 74 determines whether or not the distance between the affine transformation parameters determined from all the match pairs and the average of the affine transformation parameters determined from the match pairs with the respective self-modulated images 91-1 to 91-N is equal to or smaller than a threshold value.

If it is determined in the step S127 that the error is larger than the threshold value, the recognition determination unit 74 bans the recognition determination processing in the step S129. That is, the recognition determination processing is ended.

In contrast, if it is determined in the step S127 that the error is equal to or smaller than the threshold value, the processing sequence proceeds to a step S128.

In the step S128, the recognition determination unit 74 carries out recognition determination based on the number of match pairs of which error from the affine transformation parameters determined from all the match pairs is equal to or smaller than a threshold value.

The end of the step S128 is equivalent to the end of the new recognition determination processing of FIG. 21.

This is the end of the description of the self-modulated image matching scheme to which an embodiment of the present invention is applied.

It should be noted that the self-modulated image matching scheme is merely one mode of the scheme according to an embodiment of the present invention as described above. That is, in the scheme according to an embodiment of the present invention, images other than the model image 81 as the targets of local feature matching with the input image 82 may be any images as long as these images can be created from the model image 81 by using predetermined transformation coefficients (hereinafter, such images will be referred to as transformed images). The scheme according to an embodiment of the present invention in which the self-modulated images 91 are employed as the transformed images is the self-modulated image matching scheme.

Figure 22:
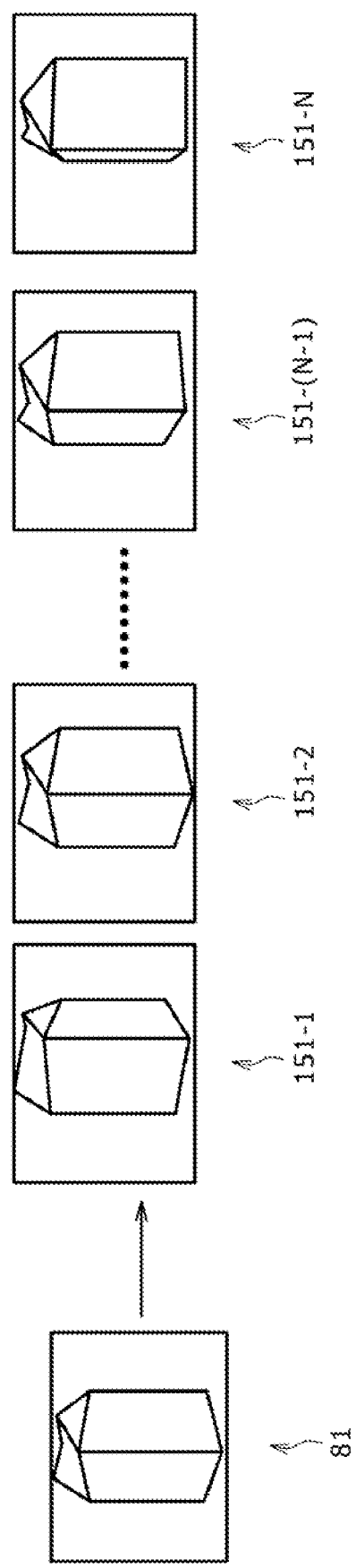
FIG. 22 is a diagram for explaining a model peripheral image matching scheme as one mode of the scheme according to an embodiment of the invention.

A scheme employing another type of transformed images shown in FIG. 22 is also available for example. Specifically, in this scheme, besides a model image 81, N images 151-1 to 151-N are prepared. For the preparation of these N images 151-1 to 151-N, N viewpoints that are different from the viewpoint of the model 81 and in the periphery of the viewpoint of the model 81 are defined. That is, each of the N images 151-1 to 151-N arises from imaging from a respective one of these N viewpoints (hereinafter, these N images 151-1 to 151-N will be referred to as model peripheral images 151-1 to 151-N). These N model peripheral images 151-1 to 151-N can be employed as transformed images. However, this scheme involves the need to estimate transformation coefficients from the relationship between the model image 81 and each of the N model peripheral images 151-1 to 151-N.

Hereinafter, this scheme employing the model peripheral images 151-1 to 151-N as transformed images as one mode of the scheme according to an embodiment of the present invention will be referred to as a model peripheral image matching scheme.

FIG. 23 shows a functional configuration example of an image recognition device to which this model peripheral image matching scheme is applied.

The same parts in FIG. 23 as those in FIG. 6 are given the same numerals, and the description thereof is accordingly omitted.

In the example of FIG. 23, the image recognition device includes a learning part 201, a feature database 52, and a recognition part 53.

The learning part 201 includes a feature point extractor 61, a feature extractor 62, a feature point extractor 112, a feature extractor 114, a feature point position converter 113, and a transformation coefficient estimator 211.

The feature point extractor 61 extracts model feature points from a model image 81 and provides the model feature points to the feature extractor 62. The feature extractor 62 extracts the feature of each of the model feature points extracted by the feature point extractor 61, and stores the extracted features together with the position information of the model feature points in the feature database 52.

The transformation coefficient estimator 211 estimates N transformation coefficients 221-1 to 221-N that would be used if each of the N model peripheral images 151-1 to 151-N was created from the model image 81, based on the image recognition results for the model image 81 and the N model peripheral images 151-1 to 151-N. The feature point position converter 113 is informed of the N transformation coefficients 221-1 to 221-N estimated by the transformation coefficient estimator 211. A specific example of the transformation coefficient estimator 211 will be described later with reference to FIG. 24.

Hereinafter, when there is no need to differentiate the model peripheral images 151-1 to 151-N from each other, the model peripheral images 151-1 to 151-N will be referred to simply as model peripheral images 151. In this case, the transformation coefficients 221-1 to 221-N will be referred to simply as transformation coefficients 221.

The feature point extractor 112 extracts model feature points from the model peripheral images 151 and informs the feature point position converter 113 of the positions of the model feature points on the model peripheral images 151. The feature point position converter 113 converts the positions of the model feature points on the model peripheral images 151 into the corresponding positions on the model image 81 by using the transformation coefficients 221 informed by the transformation coefficient estimator 211, and informs the feature point extractor 112 of the corresponding positions resulting from the conversion. The feature point extractor 112 provides the feature extractor 114 with the model feature points associated with the corresponding positions thereof on the model image 81.

The feature extractor 114 extracts the feature of each of the model feature points extracted by the feature point extractor 112, and stores in the feature database 52 the extracted features associated with the corresponding positions of the feature points of the features on the model image 81. That is, not the positions of the model feature points on the model peripheral images 151 but the corresponding positions on the model image 81 are stored in the feature database 52 as the position information of the model feature points of the model peripheral images 151.

Although only one model image 81 is shown in the example of FIG. 23 is similarly to the example of FIG. 6, plural model images are given to the learning part 201 in practice. Specifically, in a practical feature database 52, for each of the plural model images, the respective features and the position information of the respective model feature points (corresponding positions on the model image 81 for the model peripheral images 151) of the original model image and the N model peripheral images 151-1 to 151-N are stored.

The recognition part 53 has the same configuration as that in the example of FIG. 6 basically, and hence the description thereof is omitted.

Figure 24:
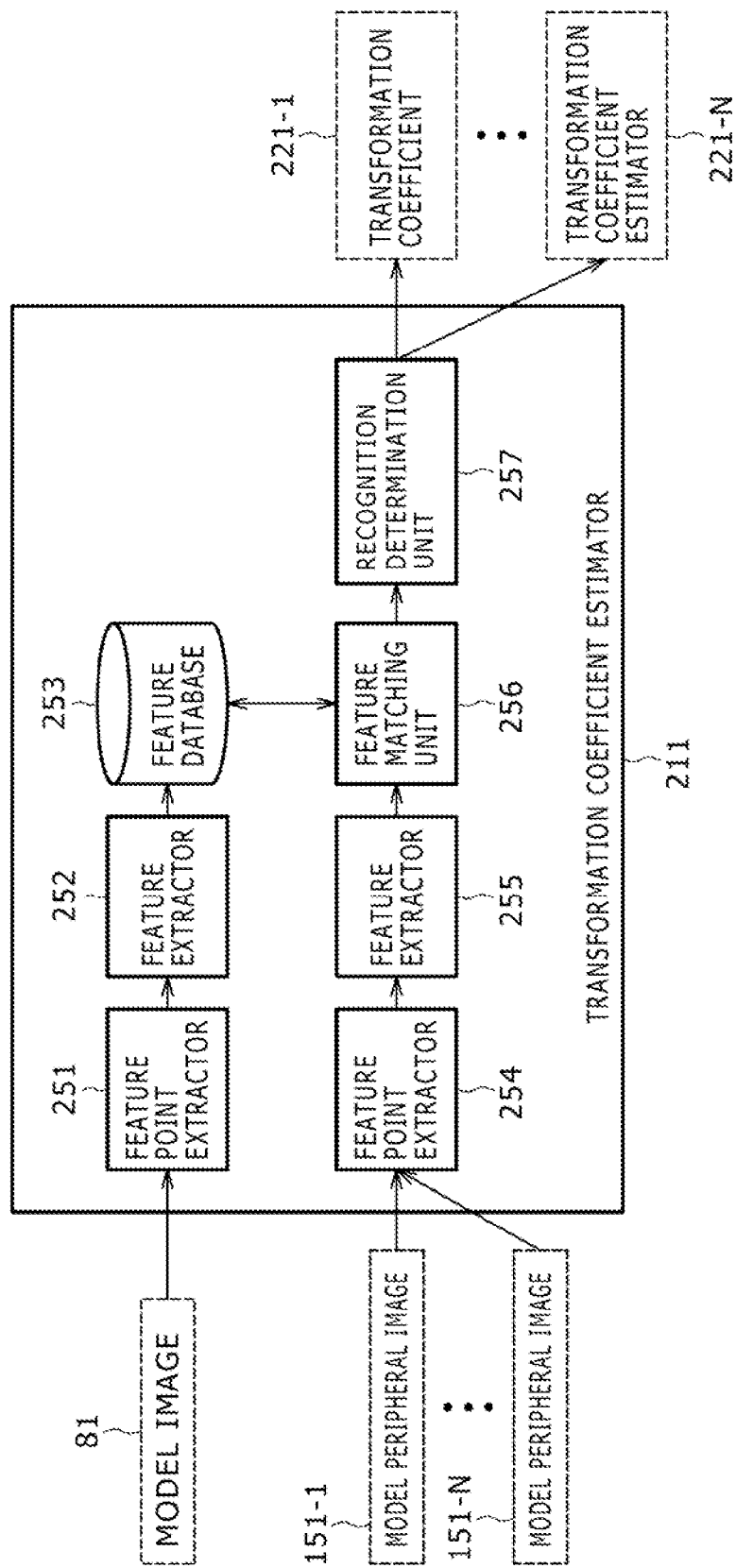
FIG. 24 is a block diagram showing a detailed configuration example of a transformation coefficient estimator in the image recognition device of FIG. 23.

FIG. 24 shows a detailed configuration example of the above-described transformation coefficient estimator 211.

The transformation coefficient estimator 211 in the example of FIG. 24 estimates and outputs affine transformation parameters as the transformation coefficients 221 under constraint that the model peripheral images 151 result from affine transformation for the model image 81.

For this purpose, the transformation coefficient estimator 211 in the example of FIG. 24 includes units from a feature point extractor 251 to a recognition determination unit 257. That is, the transformation coefficient estimator 211 in the example of FIG. 24 has a configuration basically similar to that of the existing image recognition device of FIG. 2, and is fed with the model peripheral images 151-1 to 151-N as equivalents of the input image 82 in FIG. 2.

Specifically, the feature point extractor 251 extracts model feature points from a model image 81 and provides the model feature points to a feature extractor 252. The feature extractor 252 extracts the feature of each of the model feature points extracted by the feature point extractor 251, and stores the extracted features together with the position information of the model feature points in a feature database 253.

A feature point extractor 254 extracts object feature points from the model peripheral images 151 and provides the object feature points to a feature extractor 255. The feature extractor 255 extracts features of the object feature points extracted by the feature point extractor 254, and provides a feature matching unit 256 with the extracted features together with the position information of the object feature points.

The feature matching unit 256 creates a match pair group by executing the above-described matching processing shown in FIG. 14 and so on, and provides the match pair group to the recognition determination unit 257.

The recognition determination unit 257 calculates affine transformation parameters by executing the above-described RANSAC processing shown in FIG. 17 and so on, and outputs the affine transformation parameters as the transformation coefficients 221.

The above-described series of processing can be executed by software, although it is also possible to execute the processing by hardware.

Figure 25:
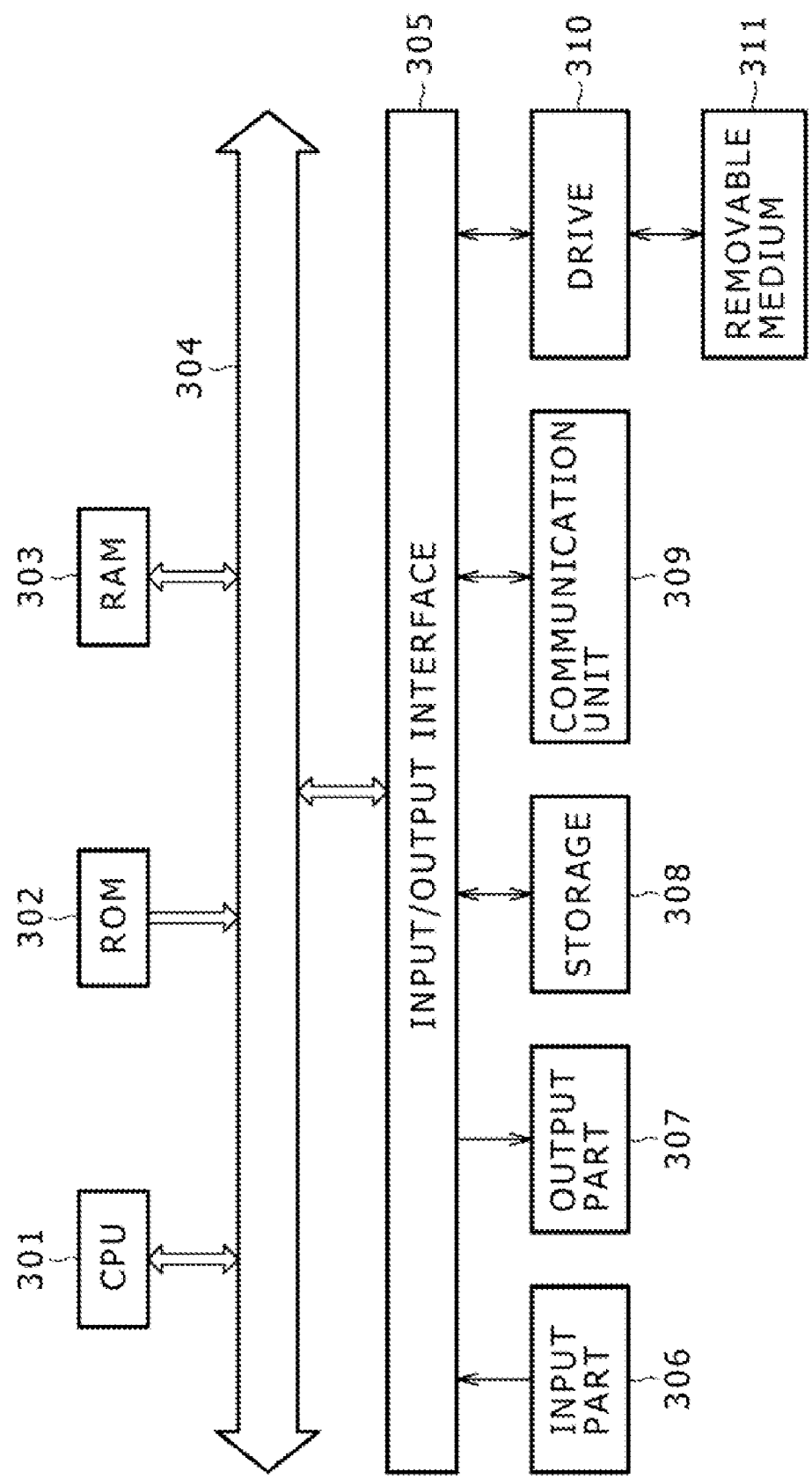
FIG. 25 is a diagram showing a configuration example when an information processing device to which an embodiment of the invention is applied is constructed with a personal computer.

In this case, all or part of the image recognition device of FIGS. 6 and 23 can be constructed by e.g. a personal computer shown in FIG. 25.

Referring to FIG. 25, a central processing unit (CPU) 301 executes various kinds of processing in accordance with a program recorded in a read only memory (ROM) 302 or a program loaded from a storage 308 to a random access memory (RAM) 303. In the RAM 303, data and so on necessary for the execution of various kinds of processing by the CPU 301 are adequately stored.

The CPU 301, the ROM 302, and the RAM 303 are coupled to each other via a bus 304. An input/output (I/O) interface 305 is also coupled to the bus 304.

Connected to the I/O interface 305 are an input part 306 formed of a keyboard, mouse, and so on, an output part 307 formed of a display and so on, the storage 308 formed of a hard disc and so on, and a communication unit 309 formed of a modem, terminal adapter, and so on. The communication unit 309 controls communication with another device (not shown) over a network including the Internet.

A drive 310 is connected to the I/O interface 305 according to need. In the drive 310, a removable recording medium 311 such as a magnetic disk, optical disk, magnet-optical disk, or semiconductor memory is adequately loaded, so that a computer program read out from the medium 311 is installed in the storage 308 according to need.

When the series of processing is executed by software, a program of the software is installed from a network or recording medium in a computer incorporated into dedicated hardware or a general-purpose personal computer, which is allowed to execute various functions through installation of various programs therein.

A recording medium including such a program is realized by the removable recording medium (package medium) 311 that stores therein the program and is distributed separately from the computer to a user for provision of the program, such as a magnetic disk (encompassing a floppy disk), optical disk (encompassing a compact disk-read only memory (CD-ROM) and digital versatile disk (DVD)), magnet-optical disk (encompassing a Mini-Disk (MD)), or semiconductor memory. Alternatively, the recording medium is realized by the ROM 302, a hard disk included in the storage 308, or the like that stores therein the program and is provided to a user in such a manner as to be incorporated into the computer in advance.

In the present specification, steps that describe a program recorded in a recording medium encompass not only processing that is executed in a time-series manner in accordance with the step order but also processing that is not necessarily executed in a time-series manner but executed in parallel or individually.

Furthermore, in the present specification, the term "system" refers to the whole of a device composed of plural devices and processing units.

While a preferred embodiment of the present invention has been described using specific terms, such description is for illustrative purpose only, and it is to be understood that changes and variations may be set without departing from the spirit or scope of the following claims.

What is claimed is:

1. An information processing device, comprising:
a storage configured to store information associated with features disposed within model images, and information associated with features disposed within transformed images, the transformed images being obtainable through an application of a transformation to corresponding ones of the model images;
an object feature point extractor configured to extract object feature points from an input image;
an object feature extractor configured to extract object features and position information corresponding to the object feature points;
a feature comparator configured to:
receive, from the storage unit, information associated with a target model image and at least one transformed image associated with the target model image, the target model image being one of the model images, and the information comprising target feature points associated with features disposed within the target model image and the transformed image and target position information corresponding to the target feature points;
compute measures of similarity between the object feature points and the target feature points, based on at least the object feature position information and the target position information;
based on the computed measures of similarity, generate a set of matched pairs for a selected one of the target feature points, the matched pairs comprising information identifying the selected target feature point and corresponding ones of the object feature points, the matched pairs being ordered in accordance with the computed measures of similarity; and
modify an ordering of the matched pairs based on at least a density gradient vector associated with the target model image; and
a recognizer configured to discard a false match from the set of matched pairs, the false match comprising one of the matched pairs and being associated with corresponding target and object feature points, wherein a spatial relationship between the corresponding target and object feature points is inconsistent with a pose of an object within the input image,
wherein:
the model image features are associated with corresponding model image feature points, and the transformed image features are associated with corresponding transformed image feature points;
the storage is further configured to store position information corresponding to the model image feature points, and position information corresponding to the transformed image feature points;
the matched pairs further comprise the target feature position information and corresponding object feature position information;
the application of the transformation transforms first positions of the model image feature points on the model images into corresponding second positions of the model feature points on the transformed images; and the recognizer is further configured to:
recognize whether a first object in one of the model images corresponds to a second object in the input image
obtain first transformation coefficients associated with the transformation applied to corresponding ones of the model images;
obtain second transformation coefficients associated with the transformed image associated with the target model image;
compute, for at least a subset of the matched pairs, corresponding values indicative of a distance between the first and second transformation coefficients; and
recognize whether the first object corresponds to the second object, based on the computed values.

2. The information processing device of claim 1, further comprising:
a transformed-image creator configured to create the transformed images from the model images by using a corresponding transformation coefficient of the transformation;
a model feature point extractor configured to extract feature points from the model images;
a model feature extractor configured to extract the features associated with the model feature points; and
a position converter configured to convert the first positions of the model feature points into the second positions by using the corresponding transformation coefficient.

3. The information processing device claim 2, wherein:
the transformed images comprise viewpoint images corresponding to a plurality of viewpoints that are different from a viewpoint of the model images and in a periphery of the viewpoint of the model images; and
the information processing device further comprises:
a model feature point extractor configured to extract at least one feature points from the model images;
a model feature extractor configured to extract the features associated with the model feature points;
an estimator configured to estimate the corresponding transformation coefficient based on the model images and the viewpoint images; and
a position converter configured to convert the first positions of the model feature points into third positions on the viewpoint images by using the corresponding transformation coefficient.

4. The information processing device of claim 1, wherein:
the transformation is associated with a plurality of transformation coefficients; and
the transformed images are obtained through an application of corresponding ones of the transformation coefficients to the model images.

5. The information processing device of claim 1, wherein the pose of the object within the input image corresponds to at least one of a rotation angle, a scaling ratio, or an amount of translation associated with the object in the input image.

6. The information processing device of claim 1, wherein the recognizer is further configured to:
compute, for at least a subset of the matched pairs, corresponding values indicative of a rotation angle of the object within the input image; and
identify a peak value within a histogram of the computed values.

7. The information processing device of claim 6, wherein the recognizer is further configured to:
determine, for a selected matched pair of the subset, whether the value indicative of the rotation angle corresponds to the peak value; and
identify the selected matched pair as the false match, when the value indicative of the rotation angle does not correspond to the peak value.

8. The information processing device of claim 6, wherein the recognizer is further configured to:
determine, for a selected matched pair of the subset, whether second estimated pose information corresponds to first estimated pose information; and
identify the selected matched pair as the false match, when the second estimated pose information for the selected matched pair does not correspond to the first estimated pose information.

9. The information processing device of claim 1, wherein the recognizer is further configured to:
compute, based at least a subset of the matched pairs, first estimated pose information for the object within the input image; and
obtain, for corresponding ones of the matches pairs of the subset, second estimated pose information for the object within the input image.

10. An information processing method, comprising:
storing, in a storage unit, information associated with features disposed within model images, and information associated with features disposed within transformed images, the transformed images being obtainable through an application of a transformation to corresponding ones of the model images;
extracting object feature points from an input image;
extracting object features and position information corresponding to the object feature points; and
receiving, from the storage unit, information associated with a target model image and at least one transformed image associated with the target model image, the target model image being one of the model images, and the information comprising target feature points associated with features disposed within the target model image and the transformed image and target position information corresponding to the target feature points;
computing measures of similarity between the object feature points and the target feature points, based on at least the object feature position information and the target position information corresponding to the target feature points;
based on the computed measures of similarity, generate a set of matched pairs for a selected one of the target feature points, the matched pairs comprising information identifying the selected target feature point and corresponding ones of the object feature points, the matched pairs being ordered in accordance with the computed measures of similarity;
modifying an ordering of the matched pairs based on at least a density gradient vector associated with the target model image; and
discarding a false match from the set of matched pairs, the false match comprising one of the matched pairs and being associated with corresponding target and object feature points, wherein a spatial relationship between the corresponding target and object feature points is inconsistent with a pose of an object within the input image, wherein:
the model image features are associated with corresponding model image feature points, and the transformed image features are associated with corresponding transformed image feature points;
the storing comprises storing position information corresponding to the model image feature points, and position information corresponding to the transformed image feature points;
the matched pairs further comprise the target feature position information and corresponding object feature position information;
the application of the transformation transforms first positions of the model image feature points on the model images into corresponding second positions of the model feature points on the transformed images; and
the method further comprises:
recognizing whether a first object in one of the model images corresponds to a second object in the input image
obtaining first transformation coefficients associated with the transformation applied to corresponding ones of the model images;
obtaining second transformation coefficients associated with the transformed image associated with the target model image;
computing, for at least a subset of the matched pairs, corresponding values indicative of a distance between the first and second transformation coefficients; and
recognizing whether the first object corresponds to the second object, based on the computed values.

11. The method of claim 10, wherein:
the transformation is associated with a plurality of transformation coefficients; and
the transformed images are obtained through an application of corresponding ones of the transformation coefficients to the model images.

12. A computer program stored on a non-transitory computer-readable medium and executed by a computer that controls processing for comparing an input image with a model image, the program comprising the steps of:
storing, in a storage unit, information associated with features disposed within model images, and information associated with features disposed within transformed images, the transformed images being obtainable through an application of a transformation to corresponding ones of the model images;
extracting object feature points from an input image;
extracting object features and position information corresponding to the object feature points; and
receiving, from the storage unit, information associated with a target model image and at least one transformed image associated with the target model image, the target model image being one of the model images, and the information comprising target feature points associated with features disposed within the target model image and the transformed image and target position information corresponding to the target feature points;
computing measures of similarity between the object feature points and the target feature points, based on at least the object feature position information and the target position information corresponding to the target feature points;
based on the computed measures of similarity, generate a set of matched pairs for a selected one of the target feature points, the matched pairs comprising information identifying the selected target feature point and corresponding ones of the object feature points, the matched pairs being ordered in accordance with the computed measures of similarity;
modifying an ordering of the matched pairs based on at least a density gradient vector associated with the target model image; and
discarding a false match from the set of matched pairs, the false match comprising one of the matched pairs and being associated with corresponding target and object feature points, wherein a spatial relationship between the corresponding target and object feature points is inconsistent with a pose of an object within the input image,
wherein:
the model image features are associated with corresponding model image feature points, and the transformed image features are associated with corresponding transformed image feature points;
the storing comprises storing position information corresponding to the model image feature points, and position information corresponding to the transformed image feature points;
the matched pairs further comprise the target feature position information and corresponding object feature position information;
the application of the transformation transforms first positions of the model image feature points on the model images into corresponding second positions of the model feature points on the transformed images; and
the method further comprises:
recognizing whether a first object in one of the model images corresponds to a second object in the input image
obtaining first transformation coefficients associated with the transformation applied to corresponding ones of the model images;
obtaining second transformation coefficients associated with the transformed image associated with the target model image;
computing, for at least a subset of the matched pairs, corresponding values indicative of a distance between the first and second transformation coefficients; and
recognizing whether the first object corresponds to the second object, based on the computed values.

13. The computer program of claim 12, wherein:
the transformation is associated with a plurality of transformation coefficients; and
the transformed images are obtained through an application of corresponding ones of the transformation coefficients to the model images.

* * * * *